US011968563B2

(12) United States Patent
Krishnan et al.

(10) Patent No.: US 11,968,563 B2
(45) Date of Patent: Apr. 23, 2024

(54) INTER-SYSTEM AND EVENT-TRIGGERED MOBILITY LOAD BALANCING

(71) Applicant: QUALCOMM Incorporated, San Diego, CA (US)

(72) Inventors: Shankar Krishnan, San Diego, CA (US); Xipeng Zhu, San Diego, CA (US); Rajeev Kumar, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/371,998

(22) Filed: Jul. 9, 2021

(65) Prior Publication Data

US 2022/0014968 A1    Jan. 13, 2022

Related U.S. Application Data

(60) Provisional application No. 63/051,090, filed on Jul. 13, 2020.

(51) Int. Cl.
*H04W 28/086* (2023.01)
*H04W 24/10* (2009.01)
(Continued)

(52) U.S. Cl.
CPC ....... *H04W 28/0865* (2023.05); *H04W 24/10* (2013.01); *H04W 28/0284* (2013.01); *H04W 28/0958* (2020.05)

(58) Field of Classification Search
CPC ......... H04W 28/0284; H04W 28/0808; H04W 28/08; H04W 24/10; H04W 28/0958; H04W 28/0819; H04W 24/02
See application file for complete search history.

(56) References Cited

U.S. PATENT DOCUMENTS 8,005,482 B2 *  8/2011  Tolli ............... H04B 17/318
                                                       455/436
9,137,324 B2 *  9/2015  Ims ................ H04L 69/329
(Continued)

FOREIGN PATENT DOCUMENTS

AU    2013251441 A1 *  10/2014   ......... G06F 16/9535
CA       2868114 A1 *  10/2013   ......... H04B 17/345
(Continued)

OTHER PUBLICATIONS

Ericsson: "Load sharing and load balancing optimization",3GPP Draft; R3-190824—Load Sharing and Load Balancing Optimization, 3rd Generation Partnership Project (3GPP), Mobile Competence Centre; 650, Route Des Lucioles; F-06921 Sophia-Antipolis Cedex; F, vol. RAN WG3, No. Athens, Greece; Feb. 25, 2019 (Year: 2019).*

(Continued)

*Primary Examiner* — Mehmood B. Khan
(74) *Attorney, Agent, or Firm* — Holland & Hart LLP

(57) ABSTRACT

Methods, systems, and devices for wireless communications are described. Some wireless communications system may utilize an inter-system information report message (e.g., a self-organizing network (SON) information report message) to support inter-system mobility load balancing (MLB). For example, a first node, operating in accordance with a first radio access technology (RAT), may receive an information report message from a second node operating in accordance with a second RAT. The information report message may include a periodic load reporting request information element (IE) or an event-triggered load reporting request IE. In response, the first node may determine a traffic load based on the load reporting request and transmit, to the second node, an information report message which includes one or more IEs for reporting the determined traffic load. The exchange (Continued)

of the load information via the IEs may enable for MLB between nodes of different RAT.

30 Claims, 14 Drawing Sheets

(51) Int. Cl.
*H04W 28/02* (2009.01)
*H04W 28/08* (2023.01)

(56) References Cited

U.S. PATENT DOCUMENTS

| | | | | |
|---|---|---|---|---|
| 9,854,479 | B2* | 12/2017 | Li | H04W 36/0022 |
| 2004/0088412 | A1* | 5/2004 | John | H04L 65/612 |
| | | | | 709/231 |
| 2011/0176424 | A1* | 7/2011 | Yang | H04L 41/082 |
| | | | | 370/235 |
| 2012/0082064 | A1* | 4/2012 | Awoniyi | H04W 52/0206 |
| | | | | 370/255 |
| 2014/0112310 | A1* | 4/2014 | Teyeb | H04W 36/0085 |
| | | | | 370/332 |
| 2014/0269364 | A1* | 9/2014 | Knapp | H04L 41/083 |
| | | | | 370/252 |
| 2016/0044518 | A1* | 2/2016 | Centonza | H04B 7/0408 |
| | | | | 370/328 |
| 2016/0055025 | A1* | 2/2016 | Jul | G06F 9/5083 |
| | | | | 718/1 |
| 2016/0119809 | A1* | 4/2016 | Lee | H04W 16/08 |
| | | | | 455/453 |
| 2016/0156520 | A1* | 6/2016 | Scully | H04L 41/0894 |
| | | | | 370/254 |
| 2017/0332302 | A1* | 11/2017 | Ercan | H04W 36/0088 |
| 2021/0092068 | A1* | 3/2021 | Ismailsheriff | H04L 47/2441 |
| 2022/0095176 | A1* | 3/2022 | Lim | H04W 36/14 |
| 2022/0141187 | A1* | 5/2022 | Biradar | H04L 63/029 |
| | | | | 726/11 |
| 2023/0052766 | A1* | 2/2023 | Choe | H04W 24/02 |

FOREIGN PATENT DOCUMENTS

| | | | | |
|---|---|---|---|---|
| EP | 2782380 B1* | 6/2019 | | H04B 7/26 |
| WO | WO-2013072271 A1* | 5/2013 | | H04W 28/0861 |
| WO | WO-2014016280 A1* | 1/2014 | | H04W 16/08 |
| WO | WO-2022124972 A1* | 6/2022 | | H04W 36/00 |

OTHER PUBLICATIONS

Huawei et al: "(TP for SON BL CR for TS 38.300): MLB", 3GPP Draft; R3-195427 MLB TP38.300, 3rd Generation Partnership Project (3GPP), Mobile Competence Centre; 650, Route Des Lucioles; F-06921 Sophia-Antipolis Cedex; France, vol. RAN WG3, No. Chongqing, China; Oct. 14, 2019-Oct. 18, 2019 Oct. 4, 2019 (Year: 2019).*

CMCC: "Further discussions on load balancing", 3GPP Draft; R3-192539_Further Discussions on Load Balancing, 3rd Generation Partnership Project (3GPP), Mobile Competence Centre; 650, Route Des Lucioles; F-06921 Sophia-Antipolis Cedex; France, vol. RAN WG3, No. Reno, NV, USA; May 13, 2019-May 17, 2019 (Year: 2019).*

NTT Docomo et al: "Way forward on Load management for NSA", 3GPP Draft; R3-183902 Wayforward on Load Management for NSA R6, 3rd Generation Partnership Project (3GPP), Mobile Competence Centre; 650, Route Des Lucioles; F-06921 Sophia-Antipolis Cedex; France, vol. RAN WG3, No. Montreal, Canada; Jul. 2, 2018 (Year : 2018).*

CMCC: "Further Discussions on Load Balancing", 3GPP Draft, 3GPP TSG-RAN WG3 #104, R3-192539, Further Discussions on Load Balancing, 3rd Generation Partnership Project (3GPP), Mobile Competence Centre, 650, Route Des Lucioles, F-06921 Sophia-Antipolis Cedex, France, vol. RAN WG3, No. Reno, NV, USA, May 13, 2019-May 17, 2019, May 13, 2019 (May 13, 2019), XP051731819, 4 Pages, Retrieved from the Internet: URL: http://www.3gpp.org/ftp/Meetings%5F3GPP%5FSYNC/RAN3/Docs/R3%2D192539%2Ezip. [Retrieved on May 13, 2019], p. 1-p. 3.

Ericsson: "Load Sharing and Load Balancing Optimization", 3GPP Draft, 3GPP TSG-RAN WG3 #103, R3-190824, Load Sharing and Load Balancing Optimization, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 25, 2019-Mar. 1, 2019, Feb. 16, 2019 (Feb. 16, 2019), XP051604758, 6 Pages, Retrieved from the Internet: URL: http://www.3gpp.org/ftp/tsg%5Fran/WG3%5Flu/TSGR3%5F103/Docs/R3%2D190824%2Ezip. [Retrieved on Feb. 16, 2019], pp. 1-2-pp. 4-6, figure 1, 4.

Huawei, et al., "(TP for SON BL CR for TS 38.300): MLB", 3GPP Draft, 3GPP TSG-RAN3 Meeting #105bis, R3-195427, MLB TP 38.300, 3rd Generation Partnership Project (3GPP), Mobile Competence Centre, 650, Route Des Lucioles, F-06921 Sophia-Antipolis Cedex, France, vol. RAN WG3, No. Chongqing, China, Oct. 14, 2019-Oct. 18, 2019, Oct. 4, 2019 (Oct. 4, 2019), XP051809808, 5 Pages, Retrieved from the Internet: URL: https://ftp.3gpp.org/tsg_ran/WG3_lu/TSGR3_105bis/Docs/R3-195427.zip. R3-195427, MLB-TP38.300.docx. [Retrieved on Oct. 4, 2019], pp. 1-4.

International Search Report and Written Opinion—PCT/US2021/041227—ISA/EPO—Nov. 8, 2021.

NTT Docomo, et al., "Way Forward on Load Management for NSA", 3GPP Draft, 3GPP TSG-RAN WG3 RAN3-AH-1807, R3-183902, Way Forward on Load Management for NSA R6, 3rd Generation Partnership Project (3GPP), Mobile Competence Centre, 650, Route Des Lucioles, F-06921 Sophia-Antipolis Cedex, France, vol. RAN WG3, No. Montreal, Canada, Jul. 2, 2018-Jul. 6, 2018, Jul. 1, 2018 (Jul. 1, 2018), XP051468186, 25 Pages, Retrieved from the Internet: URL: http://www.3gpp.org/ftp/Meetings%5F3GPP%5FSYNC/RAN3/Docs. [Retrieved on Jul. 1, 2018], p. 1-p. 4, figures 1-2.

Vice Chair (Intel Corporation): "SON/MDT Support for NR WI Session Report", 3GPP Draft, 3GPP TSG-RAN WG3 #105, R3-194653, SON MDT Report-V4, 3rd Generation Partnership Project (3GPP), Mobile Competence Centre, 650, Route Des Lucioles, F-06921 Sophia-Antipolis Cedex, France, vol. RAN WG3, No. Ljubljana, Slovenia, Aug. 26, 2019-Aug. 30, 2019, Sep. 2, 2019 (Sep. 2, 2019), XP851778814, 19 Pages, Retrieved from the Internet: URL: http://www.3gpp.org/ftp/tsg_ran/WG3_lu/TSGR3_105/Docs/R3-194653.zip. [Retrieved on Sep. 2, 2019], The whole document.

* cited by examiner

INTER-SYSTEM AND EVENT-TRIGGERED MOBILITY LOAD BALANCING

CROSS REFERENCE

The present Application for Patent claims the benefit of U.S. Provisional Patent Application No. 63/051,090 by KRISHNAN et al., entitled "INTER-SYSTEM AND EVENT-TRIGGERED MOBILITY LOAD BALANCING," filed Jul. 13, 2020, assigned to the assignee hereof, and expressly incorporated by reference herein.

FIELD OF TECHNOLOGY

The following relates generally to wireless communications and more specifically to inter-system and event-triggered mobility load balancing (MLB).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may implement mobility load balancing (MLB) to ensure a uniformly-distributed traffic load among cells or areas of cells. For example, using MLB, a traffic load may be offloaded from a congested cell of a base station to relatively less congested cells of other base stations. However, inter-system load balancing may not be supported by some systems.

SUMMARY

The described techniques relate to improved methods, systems, devices, and apparatuses that support inter-system and event-triggered mobility load balancing (MLB). Generally, the described techniques provide for a node of a first radio access technology (RAT) (e.g., evolved universal terrestrial radio access (E-UTRA)) to exchange load information with a node of a second RAT (e.g., New Radio (NR)). To support load information exchange between different RAT systems, inter-system information reporting may be enhanced. For example, a self-organizing network (SON) information report exchanged over NG and S1 interfaces may include information elements (IEs) that facilitate both periodic and event-triggered load reporting by the nodes, thereby enabling inter-system MLB. The SON information report message may include one or more load reporting request IEs which may specify which cells, beams, or slices, or any combination thereof, for which a node may report load information. Upon receipt of the load reporting request IE(s), a reporting node may determine a traffic load and report the information using one or more load reporting response IEs of the SON information report message. In some cases, the event-triggered load reporting request IE may indicate a number of measurement reporting levels and the reporting node may divide a load scale into the indicated number of measurement reporting levels.

A method for wireless communication at a first node is described. The method may include determining a traffic load at the first node based on a load reporting request, the first node operating in accordance with a first RAT and transmitting, to a second node operating in accordance with a second RAT different from the first RAT, a first information report message for MLB between the first node and the second node, the first information report message including one or more IEs for reporting the determined traffic load, where the first RAT or the second RAT includes an NR RAT or an E-UTRA RAT.

An apparatus for wireless communication at a first node is described. The apparatus may include a processor, memory coupled with the processor, and instructions stored in the memory. The instructions may be executable by the processor to cause the apparatus to determine a traffic load at the first node based on a load reporting request, the first node operating in accordance with a first RAT and transmit, to a second node operating in accordance with a second RAT different from the first RAT, a first information report message for MLB between the first node and the second node, the first information report message including one or more IEs for reporting the determined traffic load, where the first RAT or the second RAT includes an NR RAT or an E-UTRA RAT.

Another apparatus for wireless communication at a first node is described. The apparatus may include means for determining a traffic load at the first node based on a load reporting request, the first node operating in accordance with a first RAT and means for transmitting, to a second node operating in accordance with a second RAT different from the first RAT, a first information report message for MLB between the first node and the second node, the first information report message including one or more IEs for reporting the determined traffic load, where the first RAT or the second RAT includes an NR RAT or an E-UTRA RAT.

A non-transitory computer-readable medium storing code for wireless communication at a first node is described. The code may include instructions executable by a processor to determine a traffic load at the first node based on a load reporting request, the first node operating in accordance with a first RAT and transmit, to a second node operating in accordance with a second RAT different from the first RAT, a first information report message for MLB between the first node and the second node, the first information report message including one or more IEs for reporting the determined traffic load, where the first RAT or the second RAT includes an NR RAT or an E-UTRA RAT.

In some examples of the method, apparatuses, and non-transitory computer-readable medium described herein, determining the traffic load may include operations, features, means, or instructions for determining load information for a set of one or more cells, a set of one or more directional beams, a set of one or more network slices, or any combination thereof, the one or more IEs of the first information report message including a report of the determined load information.

In some examples of the method, apparatuses, and non-transitory computer-readable medium described herein, the load information includes one or more load metrics including a composite available capacity (CAC) value, a radio resource status indicator, a hardware load (HWL) indicator, a transport network load (TNL) indicator, an uplink/downlink bit rate indicator, a physical resource block (PRB) usage indicator, or any combination thereof.

Some examples of the method, apparatuses, and non-transitory computer-readable medium described herein may further include operations, features, means, or instructions for receiving, from the second node, a second information report message including one or more IEs including the load reporting request, where the one or more IEs of the second information report message include a periodic load reporting request IE, an event-triggered load reporting request IE, or any combination thereof.

Some examples of the method, apparatuses, and non-transitory computer-readable medium described herein may further include operations, features, means, or instructions for identifying, within the periodic load reporting request IE, a request for load information for a set of one or more cells, a set of one or more directional beams, a set of one or more network slices, or any combination thereof, where determining the traffic load may include operations, features, means, or instructions for determining the load information for the set of one or more cells, the set of one or more directional beams, the set of one or more network slices, or any combination thereof, where a periodic load reporting response IE of the first information report message includes the determined load information.

Some examples of the method, apparatuses, and non-transitory computer-readable medium described herein may further include operations, features, means, or instructions for identifying, within the periodic load reporting request IE, a cell global identifier (CGI) for each cell of the set of one or more cells, where the load information for the set of one or more cells may be based on the identified CGI.

Some examples of the method, apparatuses, and non-transitory computer-readable medium described herein may further include operations, features, means, or instructions for identifying, within the periodic load reporting request IE, a synchronization signal block (SSB) index for each directional beam of the set of one or more directional beams, where the load information for the set of one or more directional beams may be based on the identified SSB index.

In some examples of the method, apparatuses, and non-transitory computer-readable medium described herein, the set of one or more cells, the set of one or more directional beams, the set of one or more network slices, or any combination thereof, may be associated with the first RAT or the second RAT.

Some examples of the method, apparatuses, and non-transitory computer-readable medium described herein may further include operations, features, means, or instructions for identifying, within the event-triggered load reporting request IE, a measurement reporting level IE including a set of two or more measurement reporting levels and determining that the traffic load may have changed from a first measurement reporting level to a second measurement reporting level different from the first measurement reporting level based on the set of two or more measurement reporting levels, where transmitting the first information report message includes transmitting the first information report message to the second node based at least in part on the determination that the traffic load has changed, where an event-triggered load reporting response IE of the first information report message includes the determined load information.

In some examples of the method, apparatuses, and non-transitory computer-readable medium described herein, transmitting the first information report message may include operations, features, means, or instructions for identifying that the determined traffic load triggers an overload state of the first node and transmitting the first information report message to the second node based on the determined traffic load triggering the overload state, where an event-triggered load reporting response IE of the first information report message includes the determined load information.

In some examples of the method, apparatuses, and non-transitory computer-readable medium described herein, transmitting the first information report message may include operations, features, means, or instructions for identifying that the determined traffic load satisfies a threshold traffic level of the first node and transmitting the first information report message to the second node based on the determined traffic load satisfying the threshold traffic level, where an event-triggered load reporting response IE of the first information report message includes the determined load information.

In some examples of the method, apparatuses, and non-transitory computer-readable medium described herein, the first information report message includes an inter-system SON information report message and may be transmitted via an NG interface for a network operating in accordance with the NR RAT or an S1 interface for a network operating in accordance with the E-UTRA RAT.

A method for wireless communication at a first node is described. The method may include receiving, from a second node, a first message requesting load information from the first node for event-triggered MLB between the first node and the second node, the first message including at least an indication of a number of measurement reporting levels and an indication of measurement objects to be reported, determining, at the first node, the load information based on the indicated number of measurement reporting levels and the indicated measurement objects to be reported, and transmitting, to the second node, a second message reporting the determined load information.

An apparatus for wireless communication at a first node is described. The apparatus may include a processor, memory coupled with the processor, and instructions stored in the memory. The instructions may be executable by the processor to cause the apparatus to receive, from a second node, a first message requesting load information from the first node for event-triggered MLB between the first node and the second node, the first message including at least an indication of a number of measurement reporting levels and an indication of measurement objects to be reported, determine, at the first node, the load information based on the indicated number of measurement reporting levels and the indicated measurement objects to be reported, and transmit, to the second node, a second message reporting the determined load information.

Another apparatus for wireless communication at a first node is described. The apparatus may include means for receiving, from a second node, a first message requesting load information from the first node for event-triggered MLB between the first node and the second node, the first message including at least an indication of a number of measurement reporting levels and an indication of measurement objects to be reported, means for determining, at the first node, the load information based on the indicated number of measurement reporting levels and the indicated measurement objects to be reported, and means for transmitting, to the second node, a second message reporting the determined load information.

A non-transitory computer-readable medium storing code for wireless communication at a first node is described. The code may include instructions executable by a processor to receive, from a second node, a first message requesting load information from the first node for event-triggered MLB between the first node and the second node, the first message including at least an indication of a number of measurement reporting levels and an indication of measurement objects to be reported, determine, at the first node, the load information based on the indicated number of measurement reporting levels and the indicated measurement objects to be reported, and transmit, to the second node, a second message reporting the determined load information.

Some examples of the method, apparatuses, and non-transitory computer-readable medium described herein may further include operations, features, means, or instructions for identifying, within an IE, the indication of the number of measurement reporting levels, the number of measurement reporting levels including a set of two or more measurement reporting levels and computing a load scale that corresponds to the set of two or more measurement reporting levels based on the indication, where the determined load information may be reported based on the set of two or more measurement reporting levels.

Some examples of the method, apparatuses, and non-transitory computer-readable medium described herein may further include operations, features, means, or instructions for identifying, within an IE, the indication of the measurement objects to be reported, the measurement objects to be reported including requested load metrics for PRB event triggered load reporting, TNL capacity event triggered load reporting, CAC event triggered load reporting, or any combination thereof, where the determined load information may be reported based on the requested load metrics.

In some examples of the method, apparatuses, and non-transitory computer-readable medium described herein, determining the load information may include operations, features, means, or instructions for determining the load information for a set of one or more cells, a set of one or more directional beams, a set of one or more network slices, or any combination thereof.

In some examples of the method, apparatuses, and non-transitory computer-readable medium described herein, the first node or the second node includes a centralized unit (CU) of a base station, a distributed unit (DU) of the base station, a node associated with a user plane, a node associated with a control plane, a first base station, or a second base station.

A method for wireless communication at a first node is described. The method may include transmitting, to a second node, a first information report message for MLB between the first node and the second node, the first information report message including one or more IEs including a load reporting request, where the first node operates in accordance with a first RAT and the second node operates in accordance with a second RAT different from the first RAT, receiving, from the second node, a second information report message, the second information report message including one or more IEs reporting a traffic load of the second node, and determining to perform the MLB between the first node and the second node based on the traffic load of the second node, where the first RAT or the second RAT includes an NR RAT or an E-UTRA RAT.

An apparatus for wireless communication at a first node is described. The apparatus may include a processor, memory coupled with the processor, and instructions stored in the memory. The instructions may be executable by the processor to cause the apparatus to transmit, to a second node, a first information report message for MLB between the first node and the second node, the first information report message including one or more IEs including a load reporting request, where the first node operates in accordance with a first RAT and the second node operates in accordance with a second RAT different from the first RAT, receive, from the second node, a second information report message, the second information report message including one or more Ws reporting a traffic load of the second node, and determine to perform the MLB between the first node and the second node based on the traffic load of the second node, where the first RAT or the second RAT includes an NR RAT or an E-UTRA RAT.

Another apparatus for wireless communication at a first node is described. The apparatus may include means for transmitting, to a second node, a first information report message for MLB between the first node and the second node, the first information report message including one or more Ws including a load reporting request, where the first node operates in accordance with a first RAT and the second node operates in accordance with a second RAT different from the first RAT, means for receiving, from the second node, a second information report message, the second information report message including one or more IEs reporting a traffic load of the second node, and means for determining to perform the MLB between the first node and the second node based on the traffic load of the second node, where the first RAT or the second RAT includes an NR RAT or an E-UTRA RAT.

A non-transitory computer-readable medium storing code for wireless communication at a first node is described. The code may include instructions executable by a processor to transmit, to a second node, a first information report message for MLB between the first node and the second node, the first information report message including one or more IEs including a load reporting request, where the first node operates in accordance with a first RAT and the second node operates in accordance with a second RAT different from the first RAT, receive, from the second node, a second information report message, the second information report message including one or more IEs reporting a traffic load of the second node, and determine to perform the MLB between the first node and the second node based on the traffic load of the second node, where the first RAT or the second RAT includes an NR RAT or an E-UTRA RAT.

In some examples of the method, apparatuses, and non-transitory computer-readable medium described herein, transmitting the first information report message may include operations, features, means, or instructions for transmitting, within the first information report message, a load information request for a set of one or more cells, a set of one or more directional beams, a set of one or more network slices, or any combination thereof, the one or more IEs of the first information report message including a periodic load reporting request IE, an event-triggered load reporting request IE, or any combination thereof.

In some examples of the method, apparatuses, and non-transitory computer-readable medium described herein, the traffic load of the second node includes one or more load metrics including a CAC value, a radio resource status indicator, an HWL indicator, a TNL indicator, an uplink/downlink bit rate indicator, a PRB usage indicator, or any combination thereof.

In some examples of the method, apparatuses, and non-transitory computer-readable medium described herein, a periodic load reporting response IE of the second information report message includes load information for the set of one or more cells, the set of one or more directional beams, the set of one or more network slices, or any combination thereof.

Some examples of the method, apparatuses, and non-transitory computer-readable medium described herein may further include operations, features, means, or instructions for transmitting, within the periodic load reporting request IE, a CGI for each cell of the set of one or more cells, where the load information for the set of one or more cells may be based on the CGI.

Some examples of the method, apparatuses, and non-transitory computer-readable medium described herein may further include operations, features, means, or instructions for transmitting, within the periodic load reporting request IE, an SSB index for each directional beam of the set of one or more directional beams, where the load information for the set of one or more directional beams may be based on the SSB index.

Some examples of the method, apparatuses, and non-transitory computer-readable medium described herein may further include operations, features, means, or instructions for transmitting, within the event-triggered load reporting request IE, a measurement reporting level IE including a set of two or more measurement reporting levels, where an event-triggered load reporting response IE of the second information report message includes load information based on the set of two or more measurement reporting levels.

Some examples of the method, apparatuses, and non-transitory computer-readable medium described herein may further include operations, features, means, or instructions for receiving the second information report message may be based on the traffic load triggering an overload state of the second node for a time duration.

Some examples of the method, apparatuses, and non-transitory computer-readable medium described herein may further include operations, features, means, or instructions for receiving the second information report message may be based on the traffic load satisfying a threshold traffic level of the second node.

A method for wireless communication at a first node is described. The method may include transmitting, to a second node, a first message requesting load information from the second node for event-triggered MLB between the first node and the second node, the first message including at least an indication of a number of measurement reporting levels and an indication of measurement objects to be reported, receiving, from the second node, a second message reporting the load information of the second node, the load information being based on the indicated number of measurement reporting levels and the indicated measurement objects to be reported, and determining to perform the MLB between the first node and the second node based on the load information of the second node.

An apparatus for wireless communication at a first node is described. The apparatus may include a processor, memory coupled with the processor, and instructions stored in the memory. The instructions may be executable by the processor to cause the apparatus to transmit, to a second node, a first message requesting load information from the second node for event-triggered MLB between the first node and the second node, the first message including at least an indication of a number of measurement reporting levels and an indication of measurement objects to be reported, receive, from the second node, a second message reporting the load information of the second node, the load information being based on the indicated number of measurement reporting levels and the indicated measurement objects to be reported, and determine to perform the MLB between the first node and the second node based on the load information of the second node.

Another apparatus for wireless communication at a first node is described. The apparatus may include means for transmitting, to a second node, a first message requesting load information from the second node for event-triggered MLB between the first node and the second node, the first message including at least an indication of a number of measurement reporting levels and an indication of measurement objects to be reported, means for receiving, from the second node, a second message reporting the load information of the second node, the load information being based on the indicated number of measurement reporting levels and the indicated measurement objects to be reported, and means for determining to perform the MLB between the first node and the second node based on the load information of the second node.

A non-transitory computer-readable medium storing code for wireless communication at a first node is described. The code may include instructions executable by a processor to transmit, to a second node, a first message requesting load information from the second node for event-triggered MLB between the first node and the second node, the first message including at least an indication of a number of measurement reporting levels and an indication of measurement objects to be reported, receive, from the second node, a second message reporting the load information of the second node, the load information being based on the indicated number of measurement reporting levels and the indicated measurement objects to be reported, and determine to perform the MLB between the first node and the second node based on the load information of the second node.

Some examples of the method, apparatuses, and non-transitory computer-readable medium described herein may further include operations, features, means, or instructions for transmitting, within an IE, the indication of the number of measurement reporting levels, the number of measurement reporting levels including a set of two or more measurement reporting levels, where the load information may be based on the set of two or more measurement reporting levels.

Some examples of the method, apparatuses, and non-transitory computer-readable medium described herein may further include operations, features, means, or instructions for transmitting, within an IE, the indication of the measurement objects to be reported, the measurement objects to be reported including requested load metrics for PRB event triggered load reporting, TNL capacity event triggered load reporting, CAC event triggered load reporting, or any combination thereof, where the load information may be reported based on the requested load metrics.

In some examples of the method, apparatuses, and non-transitory computer-readable medium described herein, the load information includes load information for a set of one or more cells, a set of one or more directional beams, a set of one or more network slices, or any combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments or uses may come about via integrated chip embodiments and other non-module-component based devices (e.g., end-user devices, vehicles, communication devices, computing devices, industrial equipment, retail/purchasing devices, medical devices, or artificial intelligence (AI)-enabled devices). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), or interleaver, adders/summers). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
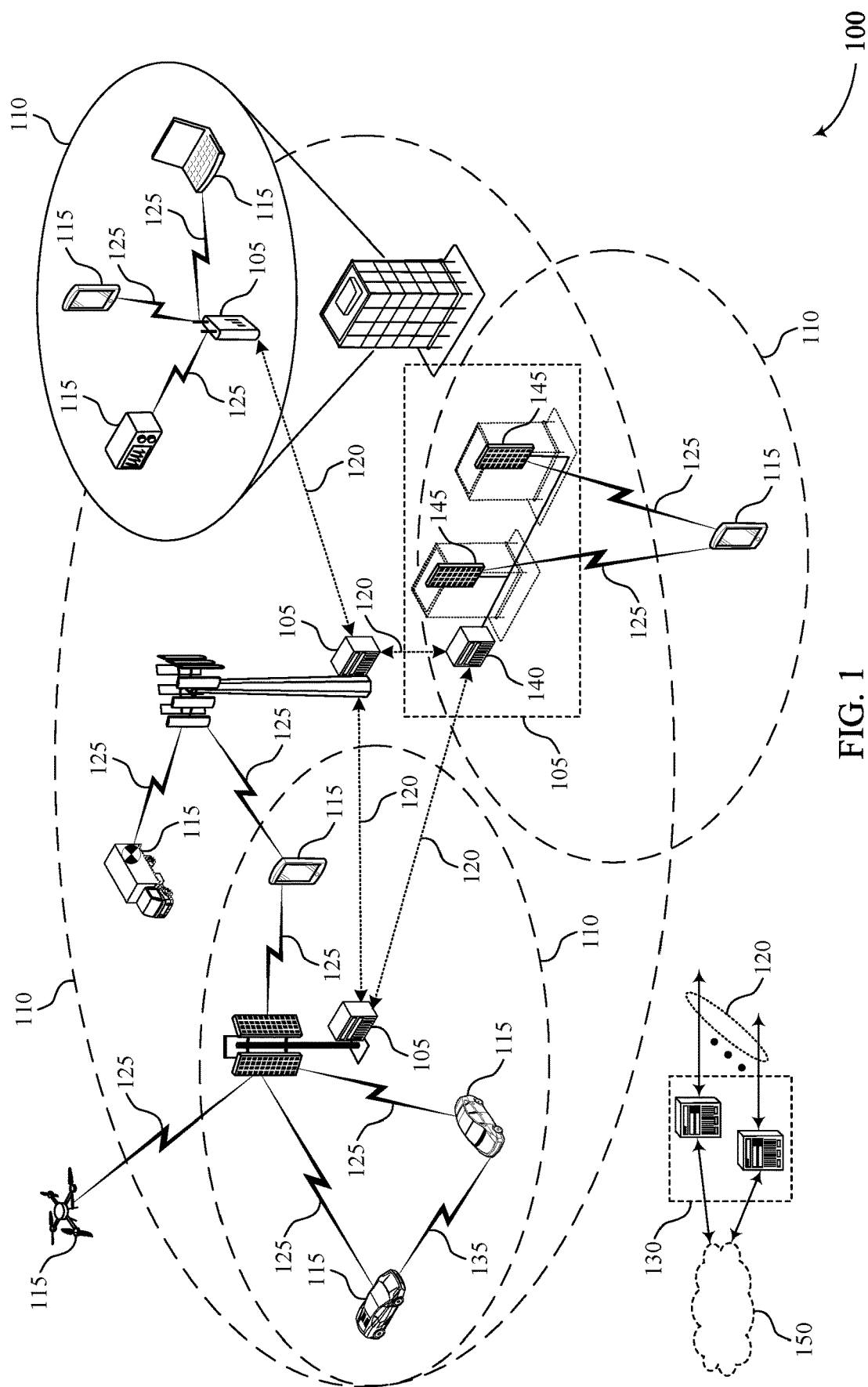
FIG. 1 and FIG. 2 illustrate examples of wireless communications systems that supports inter-system and event-triggered mobility load balancing (MLB) in accordance with aspects of the present disclosure.

Some wireless communications systems may support mobility load balancing (MLB). The objective of MLB may be to distribute a traffic load evenly among cells and among areas of cell by transferring traffic from congested cells to less congested cells. A function of MLB may include load reporting by exchanging information over respective interfaces between nodes (e.g., Xn, X2, F1, or E1 interfaces). As an example of inter-system MLB, a first base station operating in accordance with a first radio access technology (RAT) may exchange load information with a second base station operating in accordance with the first RAT over the X2 or Xn interfaces. In some examples, wireless communications systems may support mixed deployments of base stations, including base stations of a first RAT and base stations of a second RAT that may communicate with one another and further support communications for various UEs. In such examples, it may be beneficial to exchange load information between different RAT systems (e.g., inter-system load balancing) to provide network energy savings and enhanced communications performance. Specifically, inter-system load balancing for systems operating using different RATs (e.g., between a Long-Term Evolution (LTE) system and a New Radio (NR) system, or between systems using other RATs, such as those operating in accordance with future communications standards) may be desirable.

As described herein, a wireless communications system may support inter-system information reporting for inter-system MLB. For example, a self-organizing network (SON) information report message may include a load reporting request information element (IE) and a load reporting response IE for periodic and event-triggered load reporting. The load reporting request IE may indicate the cells, beams, or slices, or any combination thereof, for which a node is to report load information. Additionally, the load reporting request IE pertaining to event-triggered load reporting may also indicate a number of measurement reporting levels, and a reporting node may divide a load scale into the indicated number of measurement levels (e.g., 2, 3, or 5 levels). Upon receipt of the load reporting request IEs, a reporting node may respond with a SON information report including load reporting response IEs. The load reporting response IEs may include the load information (e.g., a composite available capacity (CAC) value, a radio resource status indicator, or a hardware load (HWL) indicator, and the like) for the requested cells, beams, or slices, or any combination thereof. As described above, the load reporting may be periodic or event-triggered. In the case of event-triggered reporting, the reporting node may exchange load information once an event is satisfied. In one example, if a value associated with load information changes (e.g., increases or decreases) from one measurement reporting level to another measurement reporting level in the load scale (e.g., determined by the reporting node and the indicated number of measurement reporting levels), then the reporting node may provide its traffic load information. In other examples, the reporting node may transmit an indication of its traffic load when a value associated with the load information exceeds a threshold value or when the load is in an overload state.

Additionally, for event-triggered MLB, a node may transmit a resource status request including IEs indicating report characteristics, which may include measurement objects (e.g., indicated by a bitmap) and the frequency at which the objects may be reported (e.g., based on various event triggers, such as physical resource block (PRB) events, transport network load (TNL) capacity events, CAC events, or the like). The resource status request may also include an IE indicating a number of measurement reporting levels. The target (e.g., reporting) node may divide a load scale by the indicated number of measurement levels and report load information if the values associated with the load information changes from one measurement reporting level to another measurement reporting level in the load scale or if the values associated with the load information exceed an overload threshold value. In response, the reporting node may transmit a resource status response (e.g., event-triggered) including the load information requested.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to inter-system and event-triggered MLB.

FIG. 1 illustrates an example of a wireless communications system 100 that supports inter-system and event-triggered MLB in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lowerpowered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications system 100 may utilize MLB to ensure a uniformly-distributed traffic load among cells or areas of cells. For example, a base station 105 operating in accordance with a first RAT (e.g., E-UTRA) may experience increased traffic loads, which may overload the resources at the base station. Using MLB, the traffic load may be offloaded from the congested cell of the base station 105 to less congested cells of nearby base stations 105 also operating in accordance with a first RAT. In some examples, wireless communications system 100 may support mixed deployment of base stations 105 (e.g., E-UTRA and NR base stations 105). In such example, it may be beneficial to exchange load information between a base station 105 operating in accordance with a first RAT and a base station 105 operating in accordance with a second RAT for network energy savings and user performance.

In some cases, wireless communications system 100 may support a node of a first RAT (e.g., E-UTRA) exchanging load information with a node of a second RAT (e.g., NR). To support load information exchange between different RATs, inter-system information reporting may be enhanced. For example, a SON information report exchanged over NG and S1 interfaces may include IEs that facilitate both periodic and event-triggered load reporting by the nodes, thereby enabling inter-system MLB. The SON information report message may include one or more load reporting request IEs which may specify which cells, beams, or slices, or any combination thereof, for which a node may report load information. Upon receipt of the load reporting request IE(s), a reporting node may determine a traffic load and report the information using one or more load reporting response IEs of the SON information report message. In some cases, the event-triggered load reporting request IE may indicate a number of measurement reporting levels and the reporting node may divide a load scale into the indicated number of measurement reporting levels. As such, wireless communications system 100 may support techniques for inter-system MLB (e.g., periodic and event-triggered) for nodes that operate using different RATs. For instance, using the described techniques, MLB may be performed between E-UTRA and NR. However, the described techniques may not be limited to inter-system MLB for E-UTRA and NR, and may be applicable to inter-system MLB for other RATs not explicitly described herein (such as additional RATs that operate in accordance with future wireless standards).

Figure 2:
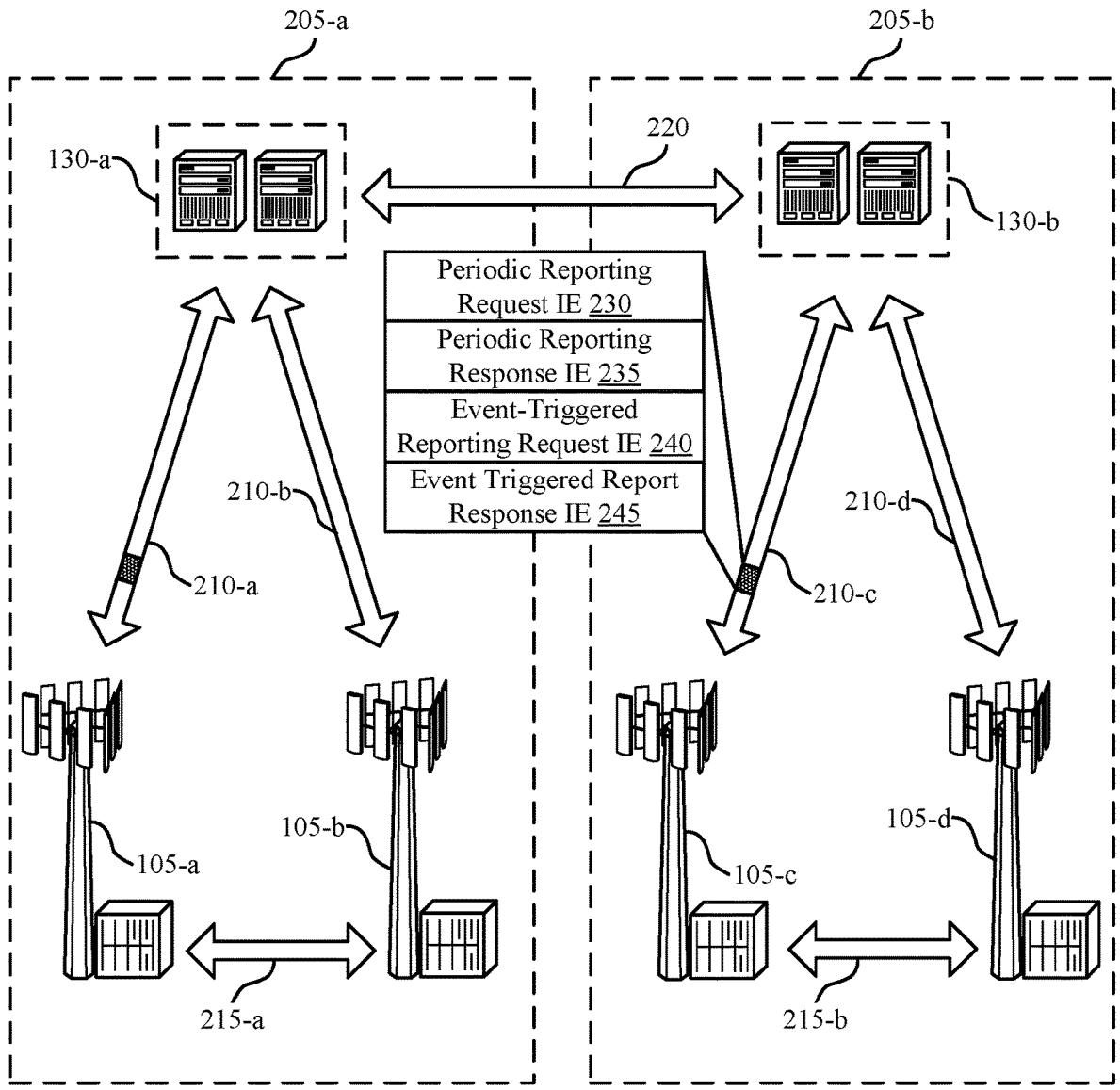

FIG. 2 illustrates an example of a wireless communications system 200 that supports inter-system and event-triggered MLB in accordance with aspects of the present disclosure. In some examples, wireless communications system 200 may implement aspects of wireless communications system 100. Wireless communications system 200 may include core network 130-*a* and core network 130-*b*, which may be examples of a core network 130 described with reference to FIG. 1. Wireless communications system also includes base station 105-*a*, base station 105-*b*, base station 105-*c*, and base station 105-*d*, which may be examples of a base station 105, as described with reference to FIG. 1.

Wireless communications system 200 may include system 205-*a* and system 205-*b*. In some examples, system 205-*a* and system 205-*b* may implement different RATs. For example, system 205-*a* may include core network 130-*a*, base station 105-*a*, and base station 105-*b*. Core network 130-*a* may be an example of a 4G core and may implement functions such as MME, S-GW, and P-GW. In some cases, base station 105-*a* may be an example of an eNB and base station 105-*b* may be an example of a en-gNB. In some examples, base station 105-*a* may act as a master node (MeNB) and communicate with core network 130-*a* in accordance with E-UTRA. In other examples, system 205-*b* may include core network 130-*b*, base station 105-*c*, and base station 105-*d*. Core network 130-*b* may be an example of a 5G core which may implement functions such as access and mobility management function (AMF), session management functions (SMF), user plane functions (UPF), and the like. In such cases, base station 105-*c* may be an example of a gNB and base station 105-*d* may be an example of an ng-eNB. In some examples, base station 105-*c* may act as a MeNB and communicate with core network 130-*b* in accordance with NR.

Core networks 130 may communicate with base stations 105 and base stations 105 may communication with one another via various interfaces. For example, core network 130-*a* may communicate with base station 105-*a* using backhaul link 210-*a* and base station 105-*b* using backhaul link 210-*b*. Backhaul link 210-*a* and backhaul link 210-*b* may be examples of S1 interfaces (e.g., an interface between a node and a core network, such as in non-standalone operations). Additionally, base station 105-*a* may communicate with base station 105-*b* via backhaul link 215-*a*. Backhaul link 215-*a* may be an example of an X2 interface (e.g., an interface allowing nodes to interconnect with each other, such as in non-standalone operations). Additionally, core network 130-*b* may communicate with base station 105-*c* using backhaul link 210-*c* and base station 105-*d* using backhaul link 210-*d*. Backhaul link 210-*c* and backhaul link 210-*d* may be examples of NG interfaces (e.g., an interface between a node and a core network, such as in standalone operations). Additionally, base station 105-*c* may communicate with base station 105-*d* via backhaul link 215-*b*. Backhaul link 215-*b* may be an example of an Xn interface (e.g., an interface allowing NG-RAN nodes to interconnect with each other). Moreover, core network 130-*a* may exchange information with core network 130-*b* over backhaul link 220 (e.g., an N26 interface). Interfaces may also exist within base stations 105. For example, an F1 interface may allow a central unit (CU) (e.g., a logical node the performs functions of a base station, such as user data transfer, mobility control, session management, radio access network sharing, and the like) and a distributed unit (DU) (e.g., a logical node controlled by the CU and performs a subset of base station functions, for example, based on a functional split between the CU and the DU) of base stations 105 to exchange information. Additionally, E1 interfaces may exist between the control unit user plane (CU-UP) and control unit control plane (CU-CP) of base stations 105.

In some examples, wireless communications system 200 may support SON, where SON may be described as a method to automate the configuration and optimization of wireless networks. Examples of functions of an SON may include self-configuration, self-optimization, and self-healing. A part of the self-optimization function of an SON may include MLB. The objective of MLB may be to evenly distribute load among cells (e.g., coverage area of a node or base stations 105 ) and areas of cells (e.g., different sectors of a cell). Additionally, MLB may aid in the transfer of traffic from congested cells or areas of cells to less congested cells or areas of cells. Moreover, MLB may offload users from one cell, cell area, carrier, or RAT to achieve network energy saving. One aspect of MLB may include load reporting by exchanging load information over the Xn, X2, F1, and E1 interfaces. Another aspect of MLB may include performing load balancing actions (e.g., handover) based on the exchanged load information.

Wireless communications system 200 may support intra-system MLB. That is, load reporting may occur within system 205-a or system 205-b. For example, base station 105-a may utilize backhaul link 215-a (e.g., X2 interface) to exchange load reporting information with base station 105-b. Base station 105-a may transmit a resource status request message to base station 105-b. The resource status request message may indicate to base station 105-b how and what load information is to be reported. In some examples, resource status request message may include multiple IEs. For example, the resource status request message may include IEs associated with report characteristics, cells to report, beams to report, etc. The report characteristics IE may include a bitmap, where each position of the bitmap indicates a measurement object base station 105-b is requested to report and the frequency it is to be reported. The measurement objects may include a PRB event trigger, a TNL capacity event trigger, and CAC event trigger, which may correspond to a first bit, a second bit, and a third bit, respectively. Additionally, the report characteristic IE may indicate periodic reporting of the measurement objects. The range for periodicity reporting may be 1 to 10 seconds. The resource status request may also include IEs that indicate the cells, beams, or slices for which load reporting is requested. Cell global identifiers (CGI) may be used to identify cells and synchronization signal block (SSB) indices may be used to identify beams. In response to the resource status request, base station 105-b may periodically transmit a resource status response message which includes load information for each of the requested cells, beams, or slices. That is, base station 105-a may exchange load information with base station 105-b and base stations 105-b may perform an action (e.g., handover) based on the exchanged load information. However, wireless communications system 200 may not support inter-system load balancing. As described herein, base station 105-a may operate according to a first RAT (e.g., E-UTRA) and base station 105-c may operate according to a second RAT (e.g., NR). In some examples, mixed deployment of base stations 105 may be implemented. In such case, it may be important for base station 105-a to exchange load information with base station 105-c to provide network energy savings and better user performance.

Wireless communications system 200 may support inter-system load balancing. For example, wireless communications system 200 may utilize an inter-system SON information report message 225 to exchange load information between system 205-a and system 205-b. An example format of SON information report message 225 may be shown by Table 1. The SON information report message 225 may contain one or more IEs for a load reporting request. For example, SON information report message 225 may include periodic load reporting request IE 230 or event-triggered load reporting request IE 240. Additionally, SON information report message 225 may include one or more IEs for a load reporting response. For example, SON information report message 225 may include periodic load reporting response IE 235 and event-triggered load reporting response IE 245. Base station 105-a, operating in accordance with E-UTRAN, may transmit SON information report message 225 including periodic load reporting request IE 230 or event-triggered load reporting request IE 240 to base station 105-c, operating in accordance with NR, and in response, base station 105-c may transmit SON information report message 225 including periodic load reporting response IE 235 or event-triggered load reporting response IE 245 to base station 105-c.

TABLE 1

Inter-system SON Information Report

| IE/Group Name | Presence |
| --- | --- |
| CHOICE SON Information Report | M |
| > handover (HO) Report Information | |
| >> Inter-system HO Report | M |
| > Failure Indication Information | |
| >> Inter-system Failure Indication | M |
| > Load Reporting Information | |
| >> Periodic Load Reporting | |
| >>> Periodic Load Reporting Request | O |
| >>> Periodic Load Reporting Response | O |
| >> Event Triggered Load Reporting | |
| >>> Event Triggered Load Reporting Request | O |
| >>> Event Triggered Load Reporting Response | O |

An example format of periodic reporting request IE 230 is shown by Tables 2 and 3. The periodic load reporting request IE 230 may include IEs pertaining to cells, beams, or slices (e.g., network slices) for which the load reports are requested. For example, the cells, beams, and slices associated with base station 105-c. The cells may be indicated using CGI and the beams may be indicated using SSB indices. In some examples, cell list IEs may be octet string type IEs and the beam list IEs may be integer type IEs (e.g., 1, 2, . . . , 64).

TABLE 2

Periodic Load Reporting Request

| IE/Group Name | Presence |
| --- | --- |
| Requested List | |
| > inter-RAT (IRAT) Cell and Beam ID | M |
| > Slice ID | O |

TABLE 3

IRAT Cell and Beam ID

| IE/Group Name | Presence |
| --- | --- |
| CHOICE Reporting RAT | M |
| > E-UTRAN | |
| >> Cell Identifier | M |
| > NR | |

TABLE 3-continued

IRAT Cell and Beam ID

| IE/Group Name | Presence |
|---|---|
| >> Cell Identifier | M |
| >> SSB List | O |
| >>> SSB Item | O |
| >>>> SSB Index | O |

An example format of periodic reporting response IE 235 is shown by Tables 4, 5, and 6. The periodic report response IE 245 may include load information for each of the requested cells, beams, and slices. Load information may include a CAC value, a radio resource status indicator, an HWL indictor, a TNL indictor, an uplink/downlink bit rate indicator, a PRB usage indicator, and the like.

TABLE 4

Periodic Load Reporting Response

| IE/Group Name | Presence |
|---|---|
| Reporting Cell List | |
| > CHOICE Reporting RAT | |
| >> E-UTRAN | M |
| >>> E-UTRAN Response | |
| >>>> Cell Identifier | M |
| >>>> E-UTRAN Load Reporting Response | O |
| >> NG-RAN Response | O |
| >>>> Slice ID | O |
| >>>> Cell Identifier | |
| >>>> SSB List | |
| >>>>> SSB Item | |
| >>>>>> SSB-Index | |
| >>>> NG-RAN Load Reporting Response | |

TABLE 5

E-UTRAN Load Reporting Response

| IE/Group Name | Presence |
|---|---|
| CAC Indicator | M |

TABLE 6

NG-RAN Load Reporting Response

| IE/Group Name | Presence |
|---|---|
| CAC Indicator | M |
| Radio Resource Indicator | O |
| TNL Capacity Load Indicator | O |
| Slice Availability Capacity Indicator | O |

An example format of event-triggered reporting request IE 240 is shown by Table 7. Event-triggered reporting response IE 240 may include an IE associated with a number (or quantity) of reporting levels. Base station 105-*a* (e.g., reporting node) may determine a load-level threshold (e.g., overload value for the TNL load capacity or the HWL capacity) for each cell, beam, slice, or a combination thereof. The load-level threshold may be divided into a number of reporting levels (e.g., 2, 3, or 5 levels) indicated by event triggered reporting request IE 240. The reporting levels may be evenly distributed on a linear scale below the load-level threshold (e.g., the overload value).

TABLE 7

Event-Triggered Load Reporting Request

| IE/Group Name | Presence |
|---|---|
| Number of Measurement Reporting Levels | M |

An example format of event-triggered reporting response IE 245 is shown by Table 8. Base station 105-*c* may report load information when the value associated with TNL capacity or HWL capacity for each beam, cell, slice, or combination thereof increases from one reporting level to another reporting level (e.g., from level 2 to level 3), enters or exits the load-level threshold, or increases beyond an absolute threshold.

TABLE 8

Event-Triggered Load Reporting Response

| IE/Group Name | Presence |
|---|---|
| Load Response | M |
| Overload Flag | O |

Additionally, the event-triggered reporting may be applied to intra-system MLB. As stated above, wireless communications system 200 may support periodic intra-system MLB reporting. For example, base station 105-*a* may send a resource status request to base station 105-*a* requesting measurement information associated with specified cells, beams, or slices and in response, base station 105-*b* may periodically transmit a resource status response indicating the measurement information. However, periodic load balancing reporting may result in unnecessary signaling and as such, a resource status message may support event-triggered reporting. For example, report characteristics IE of the resource status request may include additional measurement objects. For example, resource status report may include additional bits associated with event-triggered measurement objects. The resources status request may include a PRB usage indicator, a TNL indicator, and a CAC indicator corresponding to a sixth bit, seventh bit, and eighth bit respectively for event-triggered reporting. Additionally, resource status request may include an information element associated with a number of reporting levels. Base station 105-*b* (e.g., target node) may determine a load-level threshold (e.g., for the TNL capacity or the HWL capacity) for each cell, beam, slice, or a combination thereof and divide values below the load-level threshold into the number of reporting levels (e.g., 2, 3, or 5 levels) indicated. The reporting levels may be evenly distributed on a linear scale below the load-level threshold. If the load value changes from one level to the next, exceeds the load-level threshold, or exceed any other preconfigured threshold, base station 105-*b* may transmit the resource status report indicating the measurement information to base station 105-*a*.

Figure 3:
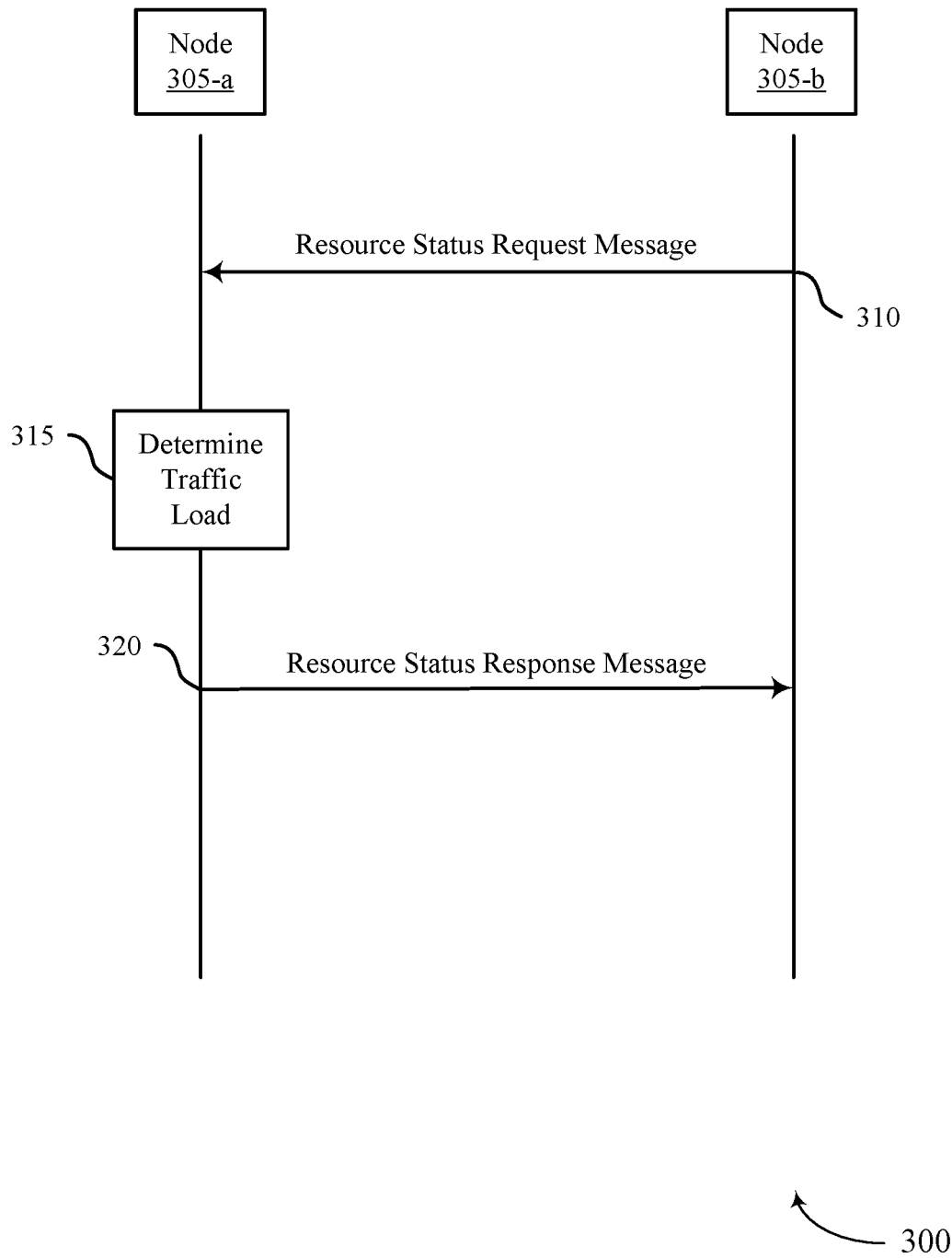
FIG. 3 and FIG. 4 illustrate examples of process flows in a system that support inter-system and event-triggered MLB in accordance with aspects of the present disclosure.

FIG. 3 illustrates an example of a process flow 300 in a system that supports inter-system and event-triggered MLB in accordance with aspects of the present disclosure. In some examples, process flow 300 may implement aspects of wireless communications system 100 and wireless communications system 200. For example, the process flow 300 may include node 305-a and node 305-b, which may be examples of base stations 105 as described with reference to FIGS. 1 and 2. Additionally, a node 305 may be an example of a CU, DU, CU-UP, CU-CP, or other node. In some examples, a wireless communication system may support event-triggered MLB. For example, node 305-a may request load information from node 305-b and in response, node 305-b may report traffic load information to node 305-a based on whether one or more events are triggered. Node 305-a and node 305-b may implement one or more techniques described herein. Alternative examples of the following may be implemented, where steps are performed in a different order than described or are not performed at all. In some cases, steps may include additional features not mentioned below, or further steps may be added.

At 310, node 305-b may transmit a resource status request message to node 305-a. In some examples, the resource status request message may be referred to as or be a first message (e.g., a message before a second message), where the first message may request load information from the node 305-a for event-triggered MLB between the node 305-a and the node 305-b. The resources status request message may include a report characteristics IE. The report characteristics IE may contain a bitmap where each position in the bitmap indicates a measurement object to be reported and the frequency at which load information is to be reported. For example, and as shown in Table 9, the bitmap may include a first bit, a second bit, and a third bit corresponding to the periodic reporting of PRB usage, TNL capacity, and CAC. Further, for event-triggered traffic reporting, the bitmap may also include a sixth bit, a seventh bit, and an eighth bit corresponding to the event-triggered reporting of PRB, TNL capacity, and CAC, respectively.

TABLE 9

| IE/Group Name | Presence | Range | IE type and reference | Semantics description |
| --- | --- | --- | --- | --- |
| Report Characteristics | C-ifRegistration RequestStart | | BITSTRING (SIZE(32)) | Each position in the bitmap indicates measurement object the NG-RAN node2 is requested to report. First Bit = PRB Periodic, Second Bit = TNL Capacity Ind Periodic, Third Bit = Composite Available Capacity Periodic, Fourth Bit = Number of Active UEs, Fifth Bit = RRC connections. Sixth Bit = PRB Event Triggered, Seventh Bit = TNL Capacity Ind Event Triggered, Eight Bit = Composite Available Capacity Event Triggered, Other bits may be ignored by the NG-RAN node2. |

The resource status request message may also include an IE indicating a number of reporting levels (e.g., 2, 3, 5, or other number of levels), as illustrated in Table 10. The resource status request may also include information elements indicating the particular beam, cell, or slice, or any combination thereof, for which load information is requested. The cell may be indicated using CGI and the beam may be indicated using SSB indices.

TABLE 10

| IE/Group Name | Presence | Range | IE type and reference | Semantics description |
| --- | --- | --- | --- | --- |
| Number Of Measurement Reporting Levels | C-ifEventTriggered | | ENUMERATED (2, 3, 4, 5, 10, .) | The reporting node divides the cell load scale into the indicated number of reporting levels, evenly distributed on a linear scale below the reporting node's threshold for overload |

At 315, node 305-a may determine a traffic load. The load information include in the traffic load may be a CAC value, a radio resource status indicator, an HWL indicator, a TNL indicator, an uplink/downlink bit rate indicator, a PRB usage indicator, or a combination thereof for each beam, cell, or slice indicated in the resource status request. The traffic load may be based on the report characteristics IE of the resource status request. Additionally or alternatively, node 305-a may determine a threshold reporting level (e.g., an overload value for TNL capacity or hardware capacity) and divide the values below the threshold reporting level into the indicated number of reporting levels. That is, node 305-a may compute a load scale, which may be based on the number (e.g., quantity or amount) of measurement reporting levels IE.

At 320, node 305-a may transmit a resource status response message to node 305-b. In some examples, the resource status response message may be referred to as or be a second message (e.g., a message after the first message or resource status request message), where the second message may report the determined traffic load. In some examples, the resource status response message may be transmitted periodically as indicated in the report characteristics IE of the resource status report message. Additionally or alternatively, the resource status response message may be transmitted once an event has occurred. For example, the load information may move from reporting level to the next reporting level or the traffic load may exceed the threshold reporting level.

Figure 4:
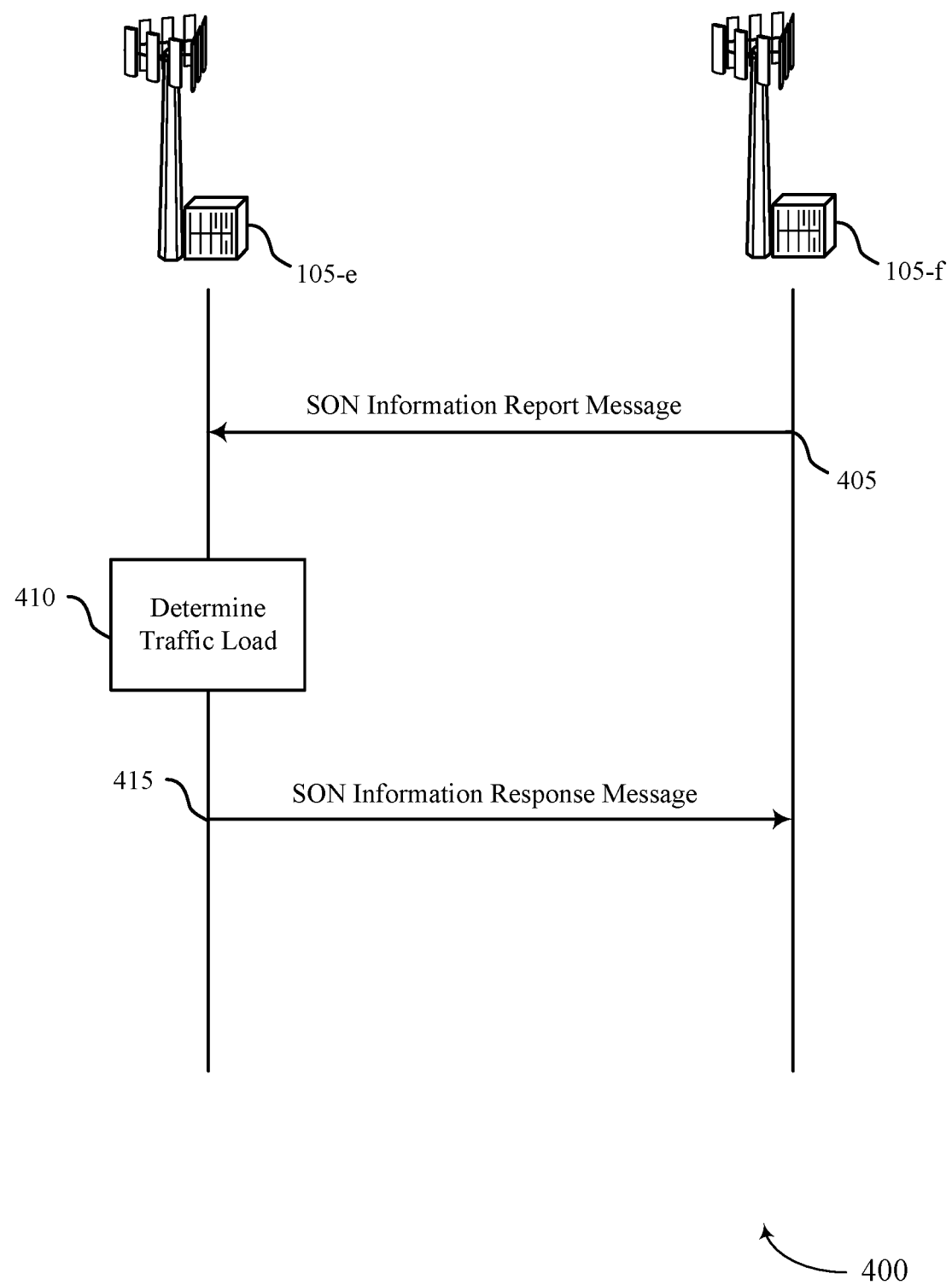

FIG. 4 illustrates an example of a process flow 400 in a system that supports inter-system and event-triggered MLB in accordance with aspects of the present disclosure. In some examples, process flow 400 may implement aspects of wireless communications system 100, wireless communications system 200, and process flow 300. For example, the process flow 400 may include base station 105-e and base station 105-f, which may be examples of base stations 105 and nodes 305 as described with reference to FIGS. 1 through 3. In some examples, a wireless communication system may support inter-system MLB. For example, base station 105-e may operate in accordance with a first RAT and base station 105-f may operate in accordance with a second RAT. Base station 105-e may exchange load information with base station 105-f. Base station 105-e and base station 105-e may implement one or more techniques described herein. Alternative examples of the following may be implemented, where steps are performed in a different order than described or are not performed at all. In some cases, steps may include additional features not mentioned below, or further steps may be added.

At 405, base station 105-f may transmit a SON information report message to base station 105-e. The SON information report message may include one or more IEs corresponding to a load reporting request. For example, the SON information report message may include a periodic load reporting request IE and event-triggered load reporting request IE. The periodic load reporting request IE may contain IEs indicating cells, beam, and slices for which load information is requested. The event-triggered load reporting request may include an IE indicating a number of measurement reporting level. As described with more detail in FIGS. 1 and 2, base station may determine a threshold reporting level and compute a load scale based on the indicated number of measurement reporting levels.

At 410, base station 105-e may determine the traffic load. Determining the traffic load may include determining load information for each of the requested beams, cells, or slices. Load information may include a CAC value, a radio resource status indicator, an HWL indicator, a TNL indicator, an uplink/downlink bit rate indicator, a PRB usage indicator, or any combination thereof.

At 415, base station 105-e may transmit a SON information report message to base station 105-f. The SON information report message may indicate the requested load information. In some examples, the SON information report message may be transmitted periodically. Additionally or alternatively, the SON information report message may be transmitted once an event has occurred. For example, the load information may move from one reporting level to the next reporting level or the load information may exceed the threshold reporting level.

Figure 5:
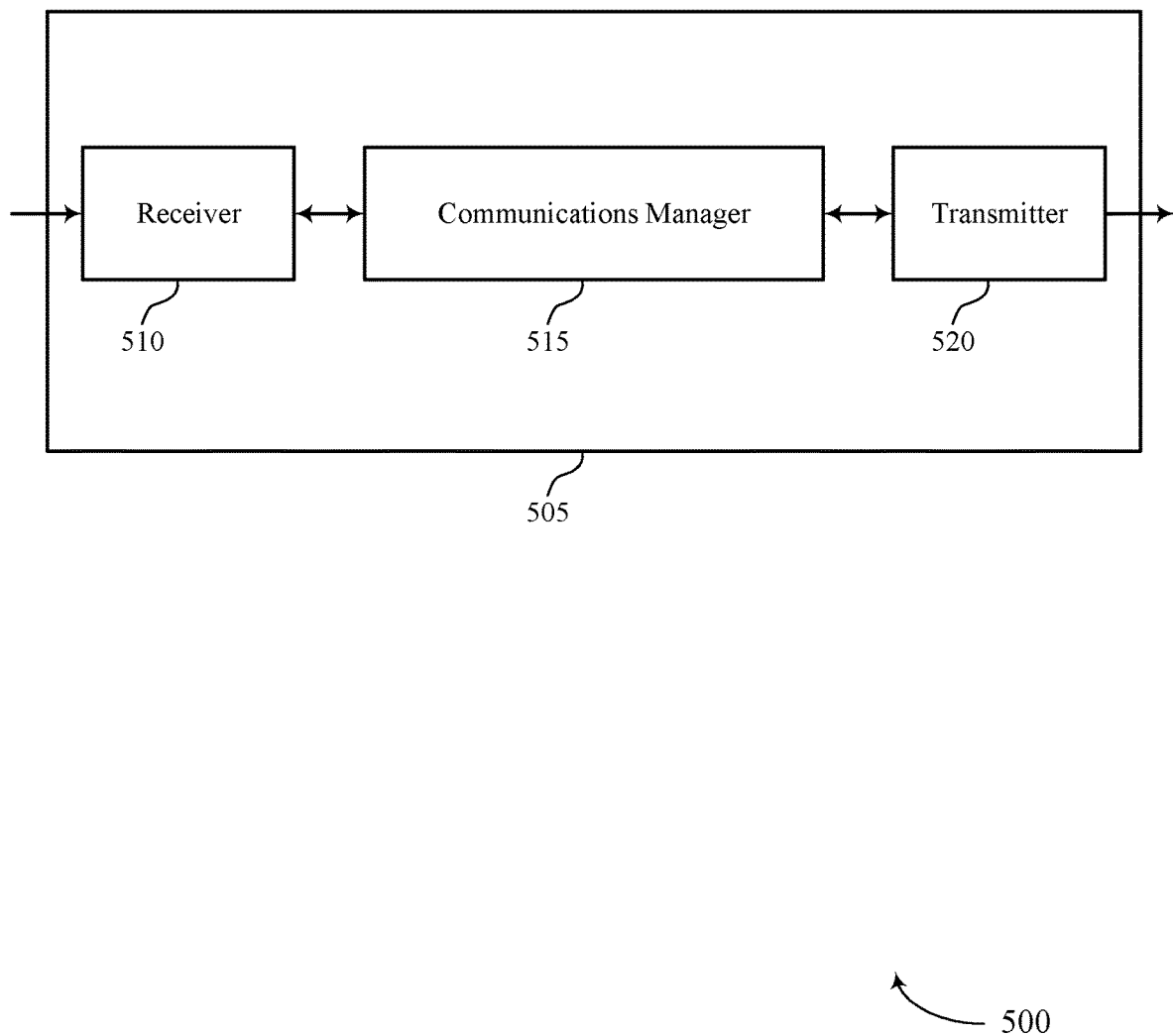
FIGS. 5 and 6 show block diagrams of devices that support inter-system and event-triggered MLB in accordance with aspects of the present disclosure.

FIG. 5 shows a block diagram 500 of a device 505 that supports inter-system and event-triggered MLB in accordance with aspects of the present disclosure. The device 505 may be an example of aspects of a wireless node (e.g., a base station 105, a node 305, a CU-UP, a CU-CP, a DU, or a CU) as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to inter-system and event-triggered MLB). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may determine a traffic load at the first node based on a load reporting request, the first node operating in accordance with a first RAT and transmit, to a second node operating in accordance with a second RAT different from the first RAT, a first information report message for MLB between the first node and the second node, the first information report message including one or more information elements for reporting the determined traffic load, where the first RAT or the second RAT includes an NR RAT or an E-UTRA RAT.

The communications manager 515 may also receive, from a second node, a first message for event-triggered MLB between the first node and the second node, the first message including at least an indication of a number of measurement reporting levels and an indication of measurement objects to be reported, determine, at the first node, the load information based on the indicated number of measurement reporting levels and the indicated measurement objects to be reported, and transmit, to the second node, a second message reporting the determined load information.

The communications manager 515 may also transmit, to a second node, a first information report message for MLB between the first node and the second node, the first information report message including one or more information elements including a load reporting request, where the first node operates in accordance with a first RAT and the second node operates in accordance with a second RAT different from the first RAT, receive, from the second node, a second information report message, the second information report message including one or more information elements reporting a traffic load of the second node, and determine to perform the MLB between the first node and the second node based on the traffic load of the second node, where the first RAT or the second RAT includes an NR RAT or an E-UTRA RAT.

The communications manager 515 may also transmit, to a second node, a first message requesting load information from the second node for event-triggered MLB between the first node and the second node, the first message including at least an indication of a number of measurement reporting levels and an indication of measurement objects to be reported, receive, from the second node, a second message reporting a load information of the second node, the load information being based on the indicated number of measurement reporting levels and the indicated measurement objects to be reported, and determine to perform the MLB between the first node and the second node based on the load information of the second node. The communications manager 515 may be an example of aspects of the communications manager 810 or 910 as described herein.

The actions performed by the communications manager 515 as described herein may be implements to realize one or more potential advantages. For example, the inclusion of IEs pertaining to periodic and even-triggered load reporting within an inter-system information report may allow the device 505 (e.g., a base station 105 or a node) to exchange load information with other devices 505 of different RAT technologies. In the event that device 505 is experiencing high traffic load, upon receiving load information, device 505 may offload users to other cells of devices 505. This may free resources at device 505 and increase overall network efficiency.

Additionally, by introducing event-triggered reporting into inter-system and intra-system load reporting, a processor of device 505 (e.g., a processor controlling the receiver 510, the communications manager 515, the transmitter 520, or a combination thereof) may reduce processing of load information used for MLB. For example, in some instance, load information may be sent upon satisfaction of an event (e.g., change in measurement reporting levels, or reaching a threshold) instead of periodically. This may significantly reduce the number of times device 505 may report load information. Not only may this decrease the processing needed to interpret the load information, but the processing used to construct the load report may also be decreased.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
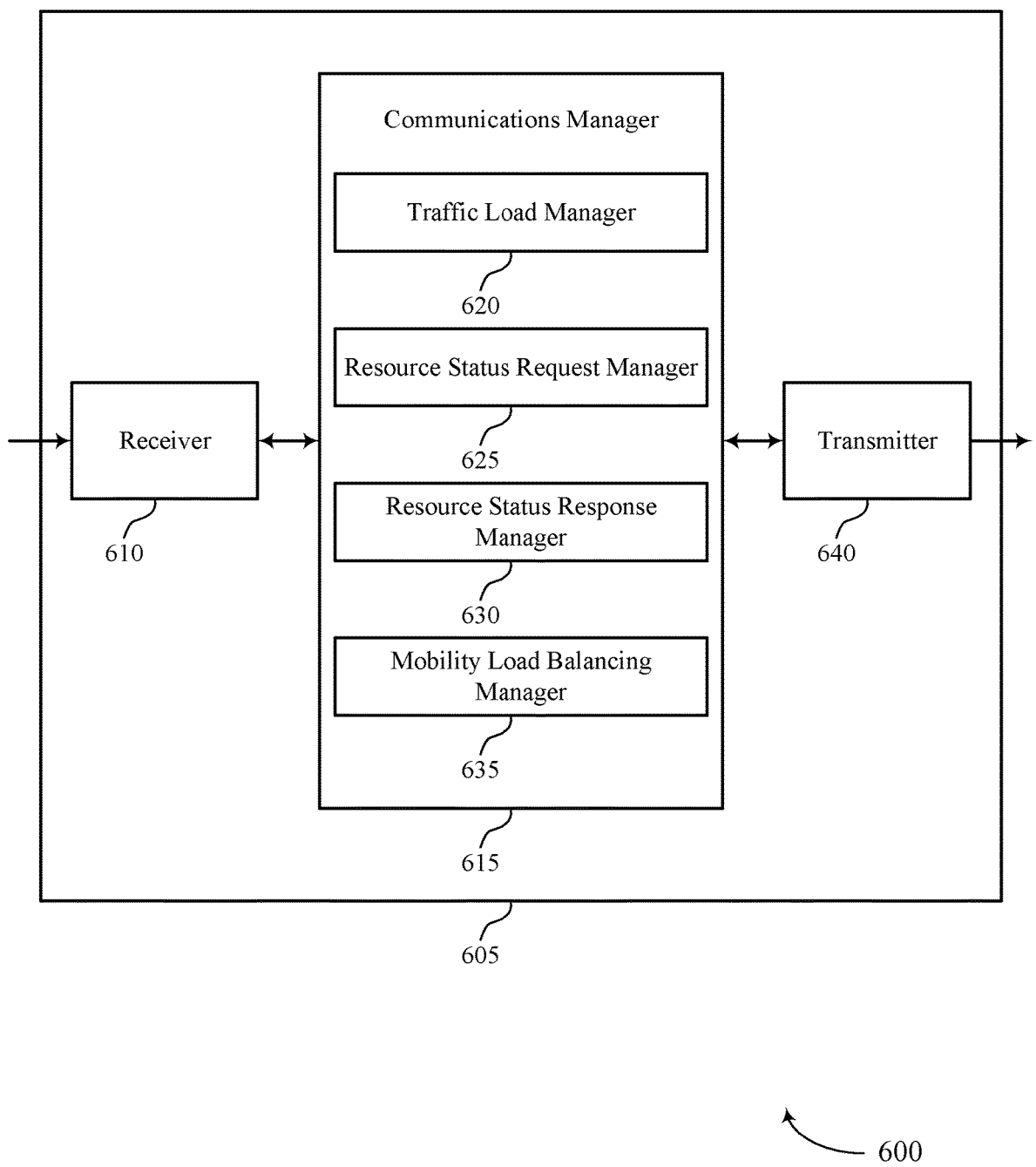

FIG. 6 shows a block diagram 600 of a device 605 that supports inter-system and event-triggered MLB in accordance with aspects of the present disclosure. The device 605 may be an example of aspects of a device 505, a base station 105, or a node 305 as described herein. The device 605 may include a receiver 610, a communications manager 615, and a transmitter 640. The device 605 may also include a processor. Each of these components may be in communication with one another (e.g., via one or more buses).

Receiver 610 may receive information such as packets, user data, or control information associated with various information channels (e.g., control channels, data channels, and information related to inter-system and event-triggered MLB). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a traffic load manager 620, a resource status request manager 625, a resource status response manager 630, and a MLB manager 635. The communications manager 615 may be an example of aspects of the communications manager 810 or 910 as described herein.

The traffic load manager 620 may determine a traffic load at the first node based on a load reporting request, the first node operating in accordance with a first RAT. In some examples, the traffic load manager 620 may transmit, to a second node operating in accordance with a second RAT different from the first RAT, a first information report message for MLB between the first node and the second node, the first information report message including one or more information elements for reporting the determined traffic load, where the first RAT or the second RAT includes an NR RAT or an E-UTRA RAT.

The resource status request manager 625 may receive, from a second node, a first message requesting load information from the first node for event-triggered MLB between the first node and the second node, the first message including at least an indication of a number of measurement reporting levels and an indication of measurement objects to be reported.

The traffic load manager 620 may determine, at the first node, the load information based on the indicated number of measurement reporting levels and the indicated measurement objects to be reported.

The resource status response manager 630 may transmit, to the second node, a second message reporting the determined load information.

The traffic load manager 620 may transmit, to a second node, a first information report message for MLB between the first node and the second node, the first information report message including one or more information elements including a load reporting request, where the first node operates in accordance with a first RAT and the second node operates in accordance with a second RAT different from the first RAT. In some examples, the traffic load manager 620 may receive, from the second node, a second information report message, the second information report message including one or more information elements reporting a traffic load of the second node.

The MLB manager 635 may determine to perform the MLB between the first node and the second node based on the traffic load of the second node, where the first RAT or the second RAT includes an NR RAT or an E-UTRA RAT.

The resource status request manager 625 may transmit, to a second node, a first message requesting load information from the second node for event-triggered MLB between the first node and the second node, the first message including at least an indication of a number of measurement reporting levels and an indication of measurement objects to be reported.

The resource status response manager 630 may receive, from the second node, a second message reporting the load information of the second node, the load information being based on the indicated number of measurement reporting levels and the indicated measurement objects to be reported.

The MLB manager 635 may determine to perform the MLB between the first node and the second node based on the load information of the second node.

Transmitter 640 may transmit signals generated by other components of the device 605. In some examples, the transmitter 640 may be collocated with a receiver 610 in a transceiver module. For example, the transmitter 640 may be an example of aspects of the transceiver 820 or 920 as described with reference to FIGS. 8 and 9. The transmitter 640 may utilize a single antenna or a set of antennas.

Figure 7:
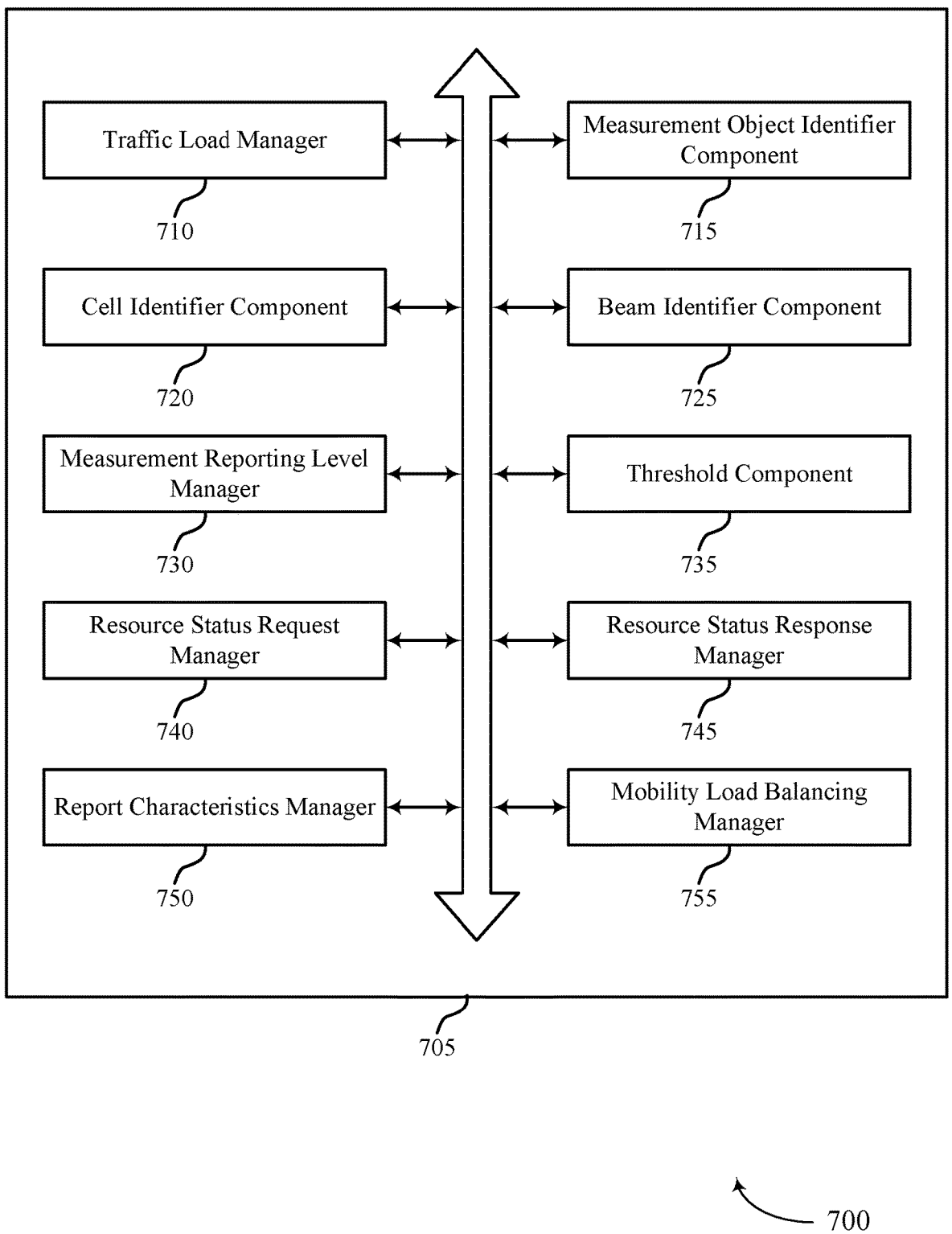
FIG. 7 shows a block diagram of a communications manager that supports inter-system and event-triggered MLB in accordance with aspects of the present disclosure.

FIG. 7 shows a block diagram 700 of a communications manager 705 that supports inter-system and event-triggered MLB in accordance with aspects of the present disclosure. The communications manager 705 may be an example of aspects of a communications manager 515, a communications manager 615, or a communications manager 810 described herein. The communications manager 705 may include a traffic load manager 710, a measurement object identifier component 715, a cell identifier component 720, a beam identifier component 725, a measurement reporting level manager 730, a threshold component 735, a resource status request manager 740, a resource status response manager 745, a report characteristics manager 750, and a MLB manager 755. Each of these modules may communicate, directly or indirectly, with one another (e.g., via one or more buses).

The traffic load manager 710 may determine a traffic load at the first node based on a load reporting request, the first node operating in accordance with a first RAT. In some examples, transmitting, to a second node operating in accordance with a second RAT different from the first RAT, a first information report message for MLB between the first node and the second node, the first information report message including one or more information elements for reporting the determined traffic load, where the first RAT or the second RAT includes an NR RAT or an E-UTRA RAT.

In some examples, the traffic load manager 710 may determine, at the first node, the load information based on the indicated number of measurement reporting levels and the indicated measurement objects to be reported. In some examples, the traffic load manager 710 may transmit, to a second node, a first information report message for MLB between the first node and the second node, the first information report message including one or more information elements including a load reporting request, where the first node operates in accordance with a first RAT and the second node operates in accordance with a second RAT different from the first RAT.

In some examples, the traffic load manager 710 may receive, from the second node, a second information report message, the second information report message including one or more information elements reporting a traffic load of the second node. In some examples, the traffic load manager 710 may determine load information for a set of one or more cells, a set of one or more directional beams, a set of one or more network slices, or any combination thereof, the one or more information elements of the first information report message including a report of the determined load information.

In some examples, the traffic load manager 710 may receive, from the second node, a second information report message including one or more information elements including the load reporting request, where the one or more information elements of the second information report message include a periodic load reporting request information element, an event-triggered load reporting request information element, or any combination thereof. In some examples, transmitting the first information report message to the second node based on the determined traffic load triggering the overload state, where an event-triggered load reporting response information element of the first information report message includes the determined load information. In some examples, transmitting the first information report message to the second node based on the determined traffic load satisfying the threshold traffic level, where an event-triggered load reporting response information element of the first information report message includes the determined load information.

In some examples, the traffic load manager 710 may determine load information for a set of one or more cells, a set of one or more directional beams, a set of one or more network slices, or any combination thereof. In some examples, the traffic load manager 710 may transmit, within the first information report message, a load information request for a set of one or more cells, a set of one or more directional beams, a set of one or more network slices, or any combination thereof, the one or more information elements of the first information report message including a periodic load reporting request information element, an event-triggered load reporting request information element, or any combination thereof.

In some examples, the traffic load manager 710 may receive the second information report message is based on the traffic load triggering an overload state of the second node for a time duration. In some examples, the traffic load manager 710 may receive the second information report message is based on the traffic load satisfying a threshold traffic level of the second node. In some cases, the load information includes one or more load metrics including a CAC value, a radio resource status indicator, an HWL indicator, a TNL indicator, an uplink/downlink bit rate indicator, a PRB usage indicator, or any combination thereof.

In some cases, the first information report message includes an inter-system SON information report message and is transmitted via an NG interface for a network operating in accordance with the NR RAT or an S1 interface for a network operating in accordance with the E-UTRA RAT.

In some cases, the first node includes a first base station providing a first cell and the second node includes a second base station providing a second cell. In some cases, the load information includes one or more load metrics including a CAC value, a radio resource status indicator, an HWL indicator, a TNL indicator, an uplink/downlink bit rate indicator, a PRB usage indicator, or any combination thereof. In some cases, the traffic load of the second node includes one or more load metrics including a CAC value, a radio resource status indicator, an HWL indicator, a TNL indicator, an uplink/downlink bit rate indicator, a PRB usage indicator, or any combination thereof.

In some cases, a periodic load reporting response information element of the second information report message includes load information for the set of one or more cells, the set of one or more directional beams, the set of one or more network slices, or any combination thereof. In some cases, the set of one or more cells, the set of one or more directional beams, the set of one or more network slices, or any combination thereof, are associated with the first RAT or the second RAT.

The resource status request manager 740 may receive, from a second node, a first message requesting load information from the first node for event-triggered MLB between the first node and the second node, the first message including at least an indication of a number of measurement reporting levels and an indication of measurement objects to be reported.

In some examples, the resource status request manager 740 may transmit, to a second node, a first message requesting load information from the second node for event-triggered MLB between the first node and the second node, the first message including at least an indication of a number of measurement reporting levels and an indication of measurement objects to be reported. In some cases, the first node or the second node includes a CU of a base station, a DU of a base station, a node associated with a user plane, a node associated with a control plane, a first base station, or a second base station.

The resource status response manager 745 may transmit, to the second node, a second message reporting the determined load information. In some examples, the resource status response manager 745 may receive, from the second node, a second message reporting the load information of the second node, the load information being based on the indicted number of measurement reporting levels and the indicated measurement objects to be reported.

In some cases, the traffic load includes load information for a set of one or more cells, a set of one or more directional beams, a set of one or more network slices, or any combination thereof. In some cases, the load information includes one or more load metrics including a CAC value, a radio resource status indicator, an HWL indicator, a TNL indicator, an uplink/downlink bit rate indicator, a PRB usage indicator, or any combination thereof.

The MLB manager 755 may determine to perform the MLB between the first node and the second node based on the traffic load of the second node, where the first RAT or the second RAT includes an NR RAT or an E-UTRA RAT. In some examples, the MLB manager 755 may determine to perform the MLB between the first node and the second node based on the load information of the second node.

The measurement object identifier component 715 may identify, within the periodic load reporting request information element, a request for load information for a set of one or more cells, a set of one or more directional beams, a set of one or more network slices, or any combination thereof. In some cases, determining the traffic load includes determining the load information for the set of one or more cells, the set of one or more directional beams, the set of one or more network slices, or any combination thereof, where a periodic load reporting response information element of the first information report message includes the determined load information.

The cell identifier component 720 may identify, within the periodic load reporting request information element, a CGI for each cell of the set of one or more cells, where the load information for the set of one or more cells is based on the identified CGI. In some examples, the cell identifier component 720 may transmit, within the periodic load reporting request information element, a CGI for each cell of the set of one or more cells, where the load information for the set of one or more cells is based on the CGI.

The beam identifier component 725 may identify, within the periodic load reporting request information element, an SSB index for each directional beam of the set of one or more directional beams, where the load information for the set of one or more directional beams is based on the identified SSB index. In some examples, the beam identifier component 725 may transmit, within the periodic load reporting request information element, an SSB index for each directional beam of the set of one or more directional beams, where the load information for the set of one or more directional beams is based on the SSB index. In some cases, the set of one or more cells, the set of one or more directional beams, the set of one or more network slices, or any combination thereof, are associated with the first RAT or the second RAT.

The measurement reporting level manager 730 may identify, within the event-triggered load reporting request information element, a measurement reporting level information element including a set of two or more measurement reporting levels. In some examples, the measurement reporting level manager 730 may identify, within an information element, the indication of the number of measurement reporting levels, the number of measurement reporting levels including a set of two or more measurement reporting levels.

In some examples, transmitting, within the event-triggered load reporting request information element, a measurement reporting level information element including a set of two or more measurement reporting levels, where an event-triggered load reporting response information element of the second information report message includes load information based on the set of two or more measurement reporting levels. In some examples, the measurement reporting level manager 730 may transmit, within an information element, the indication of the number of measurement reporting level, the number of measurement reporting levels including a set of two or more measurement reporting levels, where the load information is based on the set of two or more measurement reporting levels.

In some cases, the set of two or more measurement reporting levels include a set of uniformly distributed reporting levels, each reporting level of the set of uniformly distributed reporting levels being less than a threshold reporting level of the first node.

The threshold component 735 may determine that the traffic load has changed from a first measurement reporting level to a second measurement reporting level different from the first measurement reporting level based on the set of two or more measurement reporting levels, where transmitting the first information report message includes transmitting the first information report message to the second node based at least in part on the determination that the traffic load has changed, where an event-triggered load reporting response information element of the first information report message includes the determined load information.

In some examples, the threshold component 735 may identify that the determined traffic load triggers an overload state of the first node. In some examples, the threshold component 735 may identify that the determined traffic load satisfies a threshold traffic level of the first node. In some examples, the threshold component 735 may compute a load scale that corresponds to the set of two or more measurement reporting levels based on the indication, where the determined traffic load is reported based on the set of two or more measurement reporting levels.

The report characteristics manager 750 may identify, within an information element, the indication of measurement objects to be reported, the measurement objects to be reporting including requested load metrics for PRB event triggered load reporting, TNL capacity event triggered load reporting, CAC event triggered load reporting, or any combination thereof, where the determined traffic load is reported based on requested load metrics.

In some examples, the report characteristics manager 750 may transmit, within an information element, the indication of measurement objects to be reported, the measurement objects to be reported including requested load metrics for PRB event triggered load reporting, TNL capacity event triggered load reporting, CAC event triggered load reporting, or any combination thereof, where the traffic load is reported based on requested load metrics. In some cases, the indication of the requested load metrics includes one or more entries of a bitmap.

Figure 8:
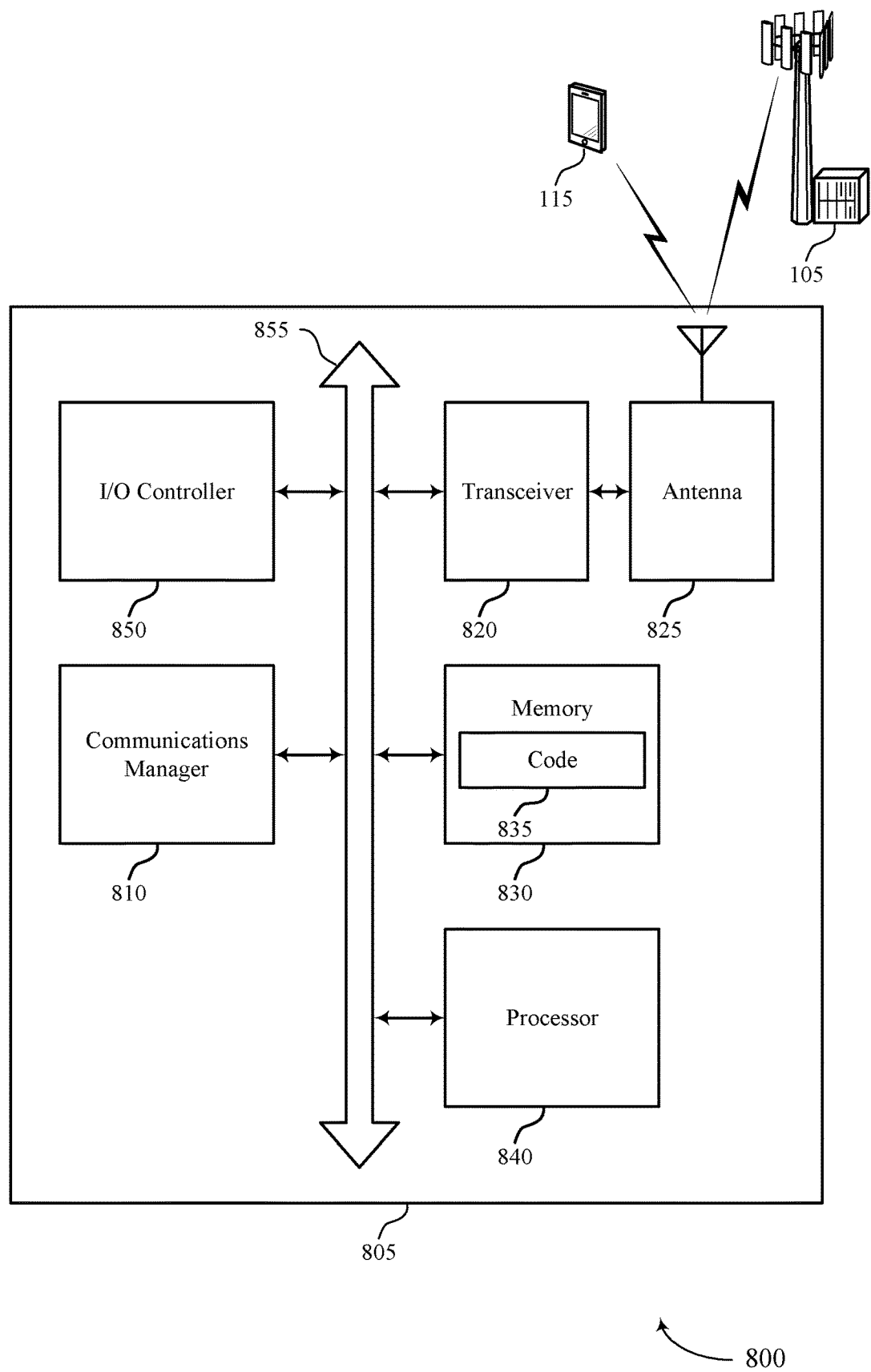
FIG. 8 shows a diagram of a system including a user equipment (UE) that supports inter-system and event-triggered MLB in accordance with aspects of the present disclosure.

FIG. 8 shows a diagram of a system 800 including a device 805 that supports inter-system and event-triggered MLB in accordance with aspects of the present disclosure. The device 805 may be an example of or include the components of device 505, device 605, a node, or a base station 105 described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may determine a traffic load at the first node based on a load reporting request, the first node operating in accordance with a first RAT and transmit, to a second node operating in accordance with a second RAT different from the first RAT, a first information report message for MLB between the first node and the second node, the first information report message including one or more information elements for reporting the determined traffic load, where the first RAT or the second RAT includes an NR RAT or an E-UTRA RAT.

The communications manager 810 may also receive, from a second node, a first message requesting load information from the first node for event-triggered MLB between the first node and the second node, the first message including at least an indication of a number of measurement reporting level and an indication of measurement objects to be reported, determine, at the first node, the load information based on the indicated number of measurement reporting levels and the indicated measurement objects to be reported, and transmit, to the second node, a second message reporting the determined load information.

The communications manager 810 may also transmit, to a second node, a first information report message for MLB between the first node and the second node, the first information report message including one or more information elements including a load reporting request, where the first node operates in accordance with a first RAT and the second node operates in accordance with a second RAT different from the first RAT, receive, from the second node, a second information report message, the second information report message including one or more information elements reporting a traffic load of the second node, and determine to perform the MLB between the first node and the second node based on the traffic load of the second node, where the first RAT or the second RAT includes an NR RAT or an E-UTRA RAT.

The communications manager 810 may also transmit, to a second node, a first message requesting load information from the second node for event-triggered MLB between the first node and the second node, the first message including at least an indication of a number of measurement reporting levels and an indication of measurement objects to be reported, receive, from the second node, a second message reporting the load information of the second node, the load information being based on the indicated number of measurement reporting levels and the indicated measurement objects to be reported, and determine to perform the MLB between the first node and the second node based on the load information of the second node.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting inter-system and event-triggered MLB).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
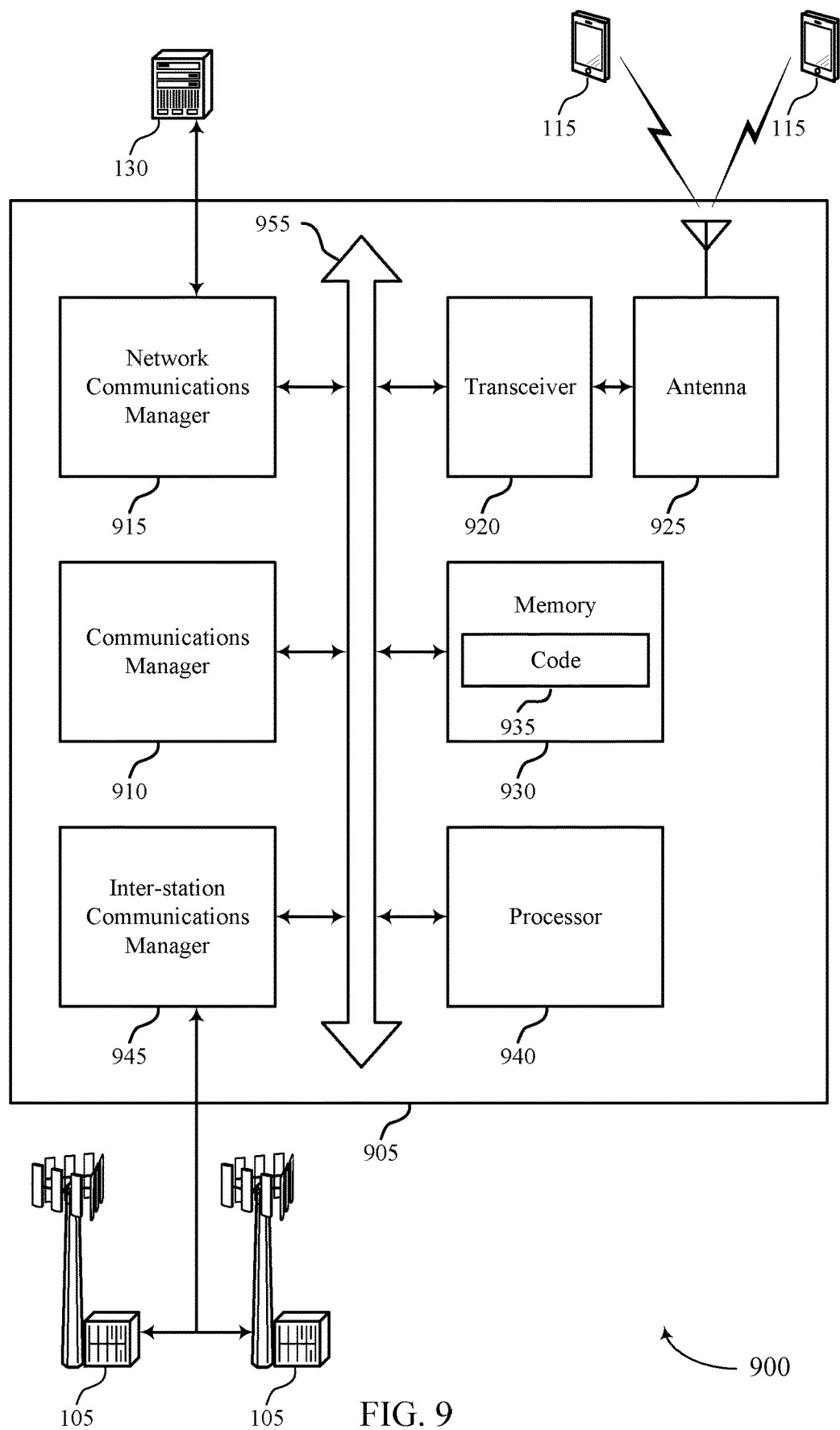
FIG. 9 shows a diagram of a system including a base station that supports inter-system and event-triggered MLB in accordance with aspects of the present disclosure.

FIG. 9 shows a diagram of a system 900 including a device 905 that supports inter-system and event-triggered MLB in accordance with aspects of the present disclosure. The device 905 may be an example of or include the components of device 505, device 605, a node, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may determine a traffic load at the first node based on a load reporting request, the first node operating in accordance with a first RAT and transmit, to a second node operating in accordance with a second RAT different from the first RAT, a first information report message for MLB between the first node and the second node, the first information report message including one or more information elements for reporting the determined traffic load, where the first RAT or the second RAT includes an NR RAT or an E-UTRA RAT.

The communications manager 910 may also receive, from a second node, a first message requesting load information from the first node for event-triggered MLB between the first node and the second node, the first message including at least an indication of a number of measurement reporting levels and an indication of measurement objects to be reported, determine, at the first node, the load information based on the indicated number of measurement reporting levels and the indicated measurement objects to be reported, and transmit, to the second node, a second message reporting the determined load information.

The communications manager 910 may also transmit, to a second node, a first information report message for MLB between the first node and the second node, the first information report message including one or more information elements including a load reporting request, where the first node operates in accordance with a first RAT and the second node operates in accordance with a second RAT different from the first RAT, receive, from the second node, a second information report message, the second information report message including one or more information elements reporting a traffic load of the second node, and determine to perform the MLB between the first node and the second node based on the traffic load of the second node, where the first RAT or the second RAT includes an NR RAT or an E-UTRA RAT.

The communications manager 910 may also transmit, to a second node, a first message requesting load information from the second node for event-triggered MLB between the first node and the second node, the first message including at least an indication of a number of measurement reporting levels and an indication of measurement objects to be reported, receive, from the second node, a second message reporting the load information of the second node, the load information being based on the indicated number of measurement reporting levels and the indicated measurement objects to be reported, and determine to perform the MLB between the first node and the second node based on the load information of the second node.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting inter-system and event-triggered MLB).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
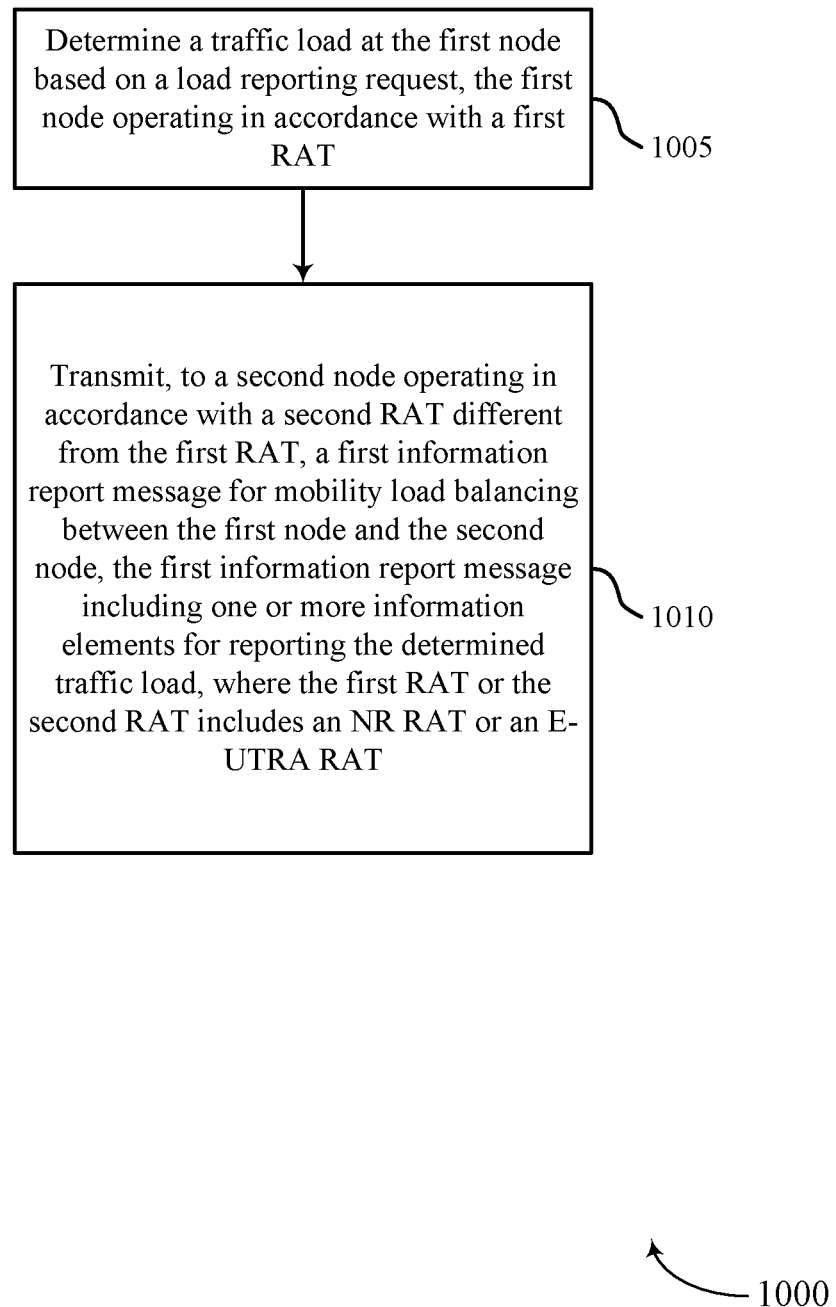
FIGS. 10 through 14 show flowcharts illustrating methods that support inter-system and event-triggered MLB in accordance with aspects of the present disclosure.

FIG. 10 shows a flowchart illustrating a method 1000 that supports inter-system and event-triggered MLB in accordance with aspects of the present disclosure. The operations of method 1000 may be implemented by first node or its components as described herein. For example, the operations of method 1000 may be performed by a communications manager as described with reference to FIGS. 5 through 9. In some examples, a node may execute a set of instructions to control the functional elements of the node to perform the functions described herein. Additionally or alternatively, a node may perform aspects of the functions described herein using special-purpose hardware.

At 1005, the first node may determine a traffic load at the first node based on a load reporting request, the first node operating in accordance with a first RAT. The operations of 1005 may be performed according to the methods described herein. In some examples, aspects of the operations of 1005 may be performed by a traffic load manager as described with reference to FIGS. 5 through 9.

At 1010, the first node may transmit, to a second node operating in accordance with a second RAT different from the first RAT, a first information report message for MLB between the first node and the second node, the first information report message including one or more information elements for reporting the determined traffic load, where the first RAT or the second RAT includes an NR RAT or an E-UTRA RAT. The operations of 1010 may be performed according to the methods described herein. In some examples, aspects of the operations of 1010 may be performed by a traffic load manager as described with reference to FIGS. 5 through 9.

Figure 11:
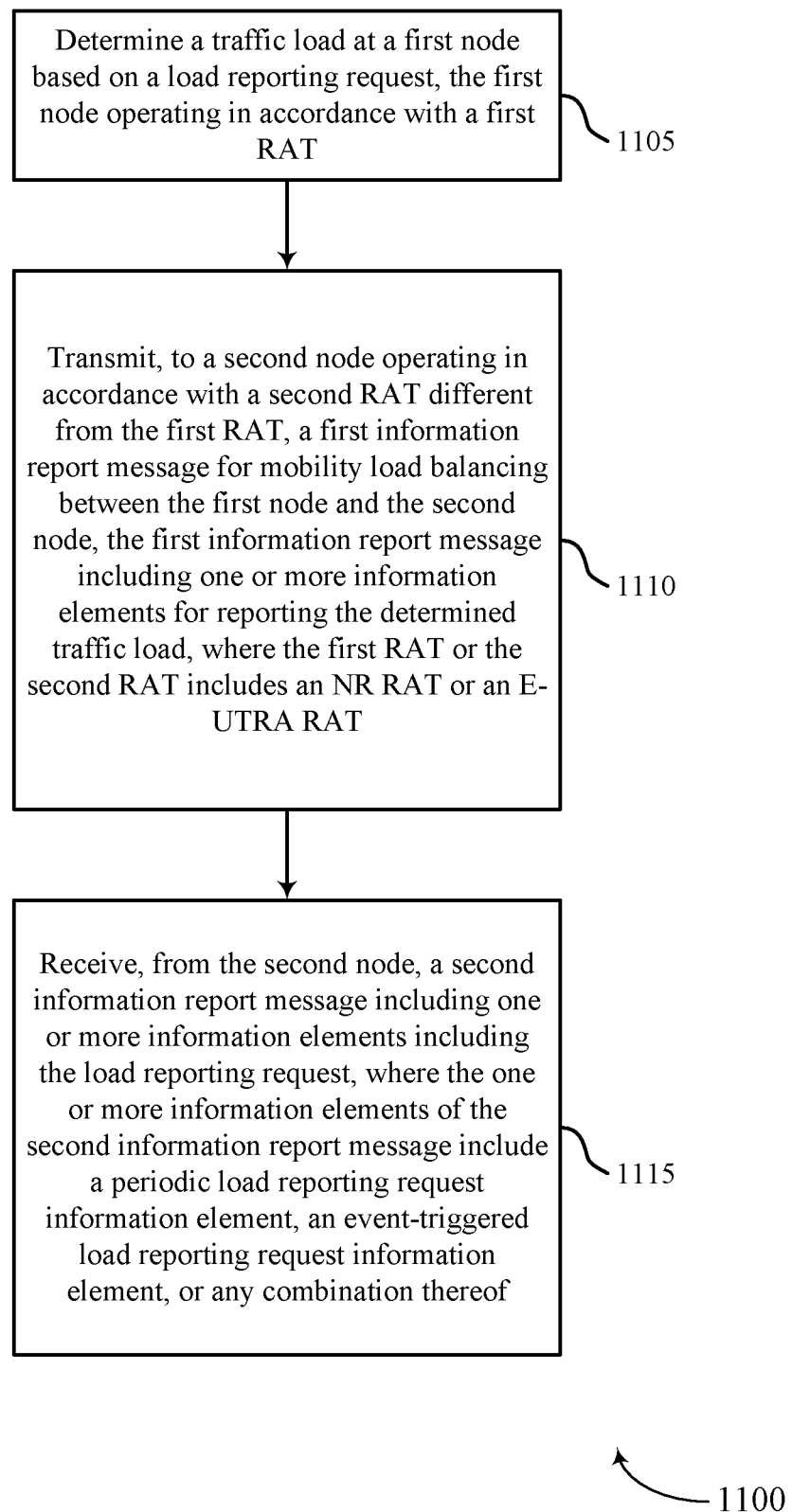

FIG. 11 shows a flowchart illustrating a method 1100 that supports inter-system and event-triggered MLB in accordance with aspects of the present disclosure. The operations of method 1100 may be implemented by a first node or its components as described herein. For example, the operations of method 1100 may be performed by a communications manager as described with reference to FIGS. 5 through 9. In some examples, a node may execute a set of instructions to control the functional elements of the node to perform the functions described herein. Additionally or alternatively, a node may perform aspects of the functions described herein using special-purpose hardware.

At 1105, the first node may determine a traffic load at the first node based on a load reporting request, the first node operating in accordance with a first RAT. The operations of 1105 may be performed according to the methods described herein. In some examples, aspects of the operations of 1105 may be performed by a traffic load manager as described with reference to FIGS. 5 through 9.

At 1110, the first node may transmit, to a second node operating in accordance with a second RAT different from the first RAT, a first information report message for MLB between the first node and the second node, the first information report message including one or more information elements for reporting the determined traffic load, where the first RAT or the second RAT includes an NR RAT or an E-UTRA RAT. The operations of 1110 may be performed according to the methods described herein. In some examples, aspects of the operations of 1110 may be performed by a traffic load manager as described with reference to FIGS. 5 through 9.

At 1115, the first node may receive, from the second node, a second information report message including one or more information elements including the load reporting request, where the one or more information elements of the second information report message include a periodic load reporting request information element, an event-triggered load reporting request information element, or any combination thereof. The operations of 1115 may be performed according to the methods described herein. In some examples, aspects of the operations of 1115 may be performed by a traffic load manager as described with reference to FIGS. 5 through 9.

Figure 12:
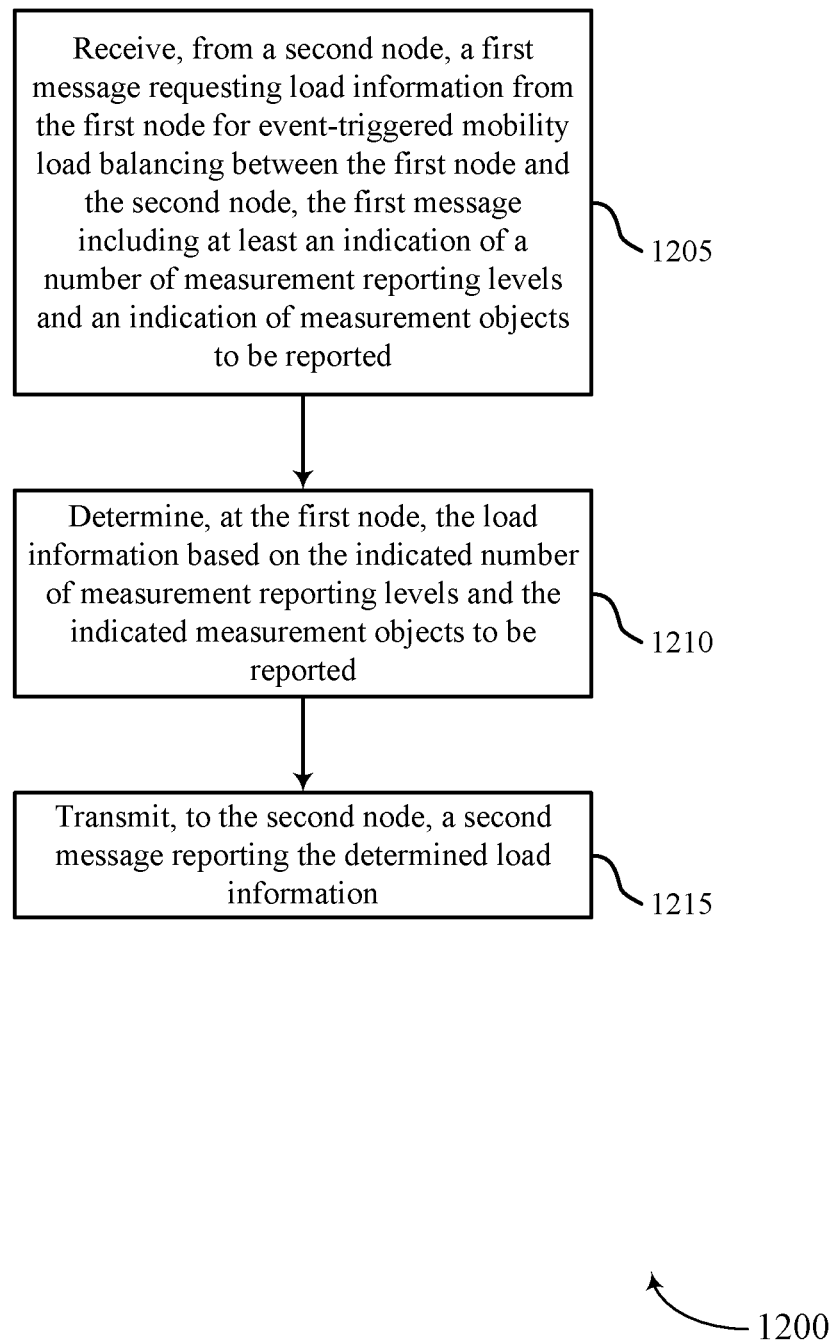

FIG. 12 shows a flowchart illustrating a method 1200 that supports inter-system and event-triggered MLB in accordance with aspects of the present disclosure. The operations of method 1200 may be implemented by a first node or its components as described herein. For example, the operations of method 1200 may be performed by a communications manager as described with reference to FIGS. 5 through 9. In some examples, a node may execute a set of instructions to control the functional elements of the node to perform the functions described herein. Additionally or alternatively, the node may perform aspects of the functions described herein using special-purpose hardware.

At 1205, a first node may receive, from a second node, a first message requesting load information from the first node for event-triggered MLB between the first node and the second node, the first message including at least an indication of a number of measurement reporting levels and an indication of measurement objects to be reported. The operations of 1205 may be performed according to the methods described herein. In some examples, aspects of the operations of 1205 may be performed by a resource status request manager as described with reference to FIGS. 5 through 9.

At 1210, the first node may determine, at the first node, the load information based on the indicated number of measurement reporting levels and the indicated measurement objects to be reported. The operations of 1210 may be performed according to the methods described herein. In some examples, aspects of the operations of 1210 may be performed by a traffic load manager as described with reference to FIGS. 5 through 9.

At 1215, the first node may transmit, to the second node, a second message reporting the determined load information. The operations of 1215 may be performed according to the methods described herein. In some examples, aspects of the operations of 1215 may be performed by a resource status response manager as described with reference to FIGS. 5 through 9.

Figure 13:
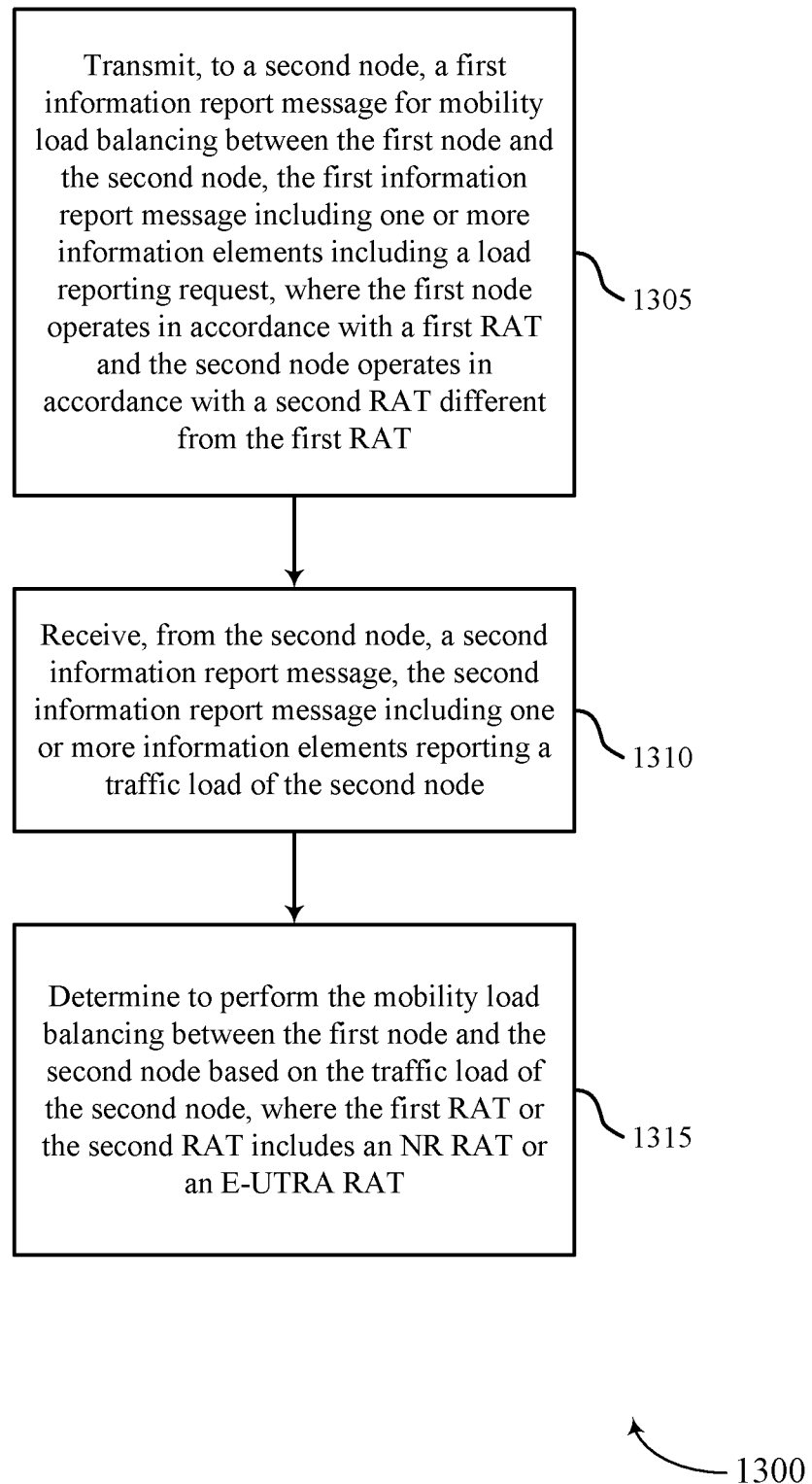

FIG. 13 shows a flowchart illustrating a method 1300 that supports inter-system and event-triggered MLB in accordance with aspects of the present disclosure. The operations of method 1300 may be implemented by a first node or its components as described herein. For example, the operations of method 1300 may be performed by a communications manager as described with reference to FIGS. 5 through 9. In some examples, a node may execute a set of instructions to control the functional elements of the node to perform the functions described herein. Additionally or alternatively, a node may perform aspects of the functions described herein using special-purpose hardware.

At 1305, the first node may transmit, to a second node, a first information report message for MLB between the first node and the second node, the first information report message including one or more information elements including a load reporting request, where the first node operates in accordance with a first RAT and the second node operates in accordance with a second RAT different from the first RAT. The operations of 1305 may be performed according to the methods described herein. In some examples, aspects of the operations of 1305 may be performed by a traffic load manager as described with reference to FIGS. 5 through 9.

At 1310, the first node may receive, from the second node, a second information report message, the second information report message including one or more information elements reporting a traffic load of the second node. The operations of 1310 may be performed according to the methods described herein. In some examples, aspects of the operations of 1310 may be performed by a traffic load manager as described with reference to FIGS. 5 through 9.

At 1315, the first node may determine to perform the MLB between the first node and the second node based on the traffic load of the second node, where the first RAT or the second RAT includes an NR RAT or an E-UTRA RAT. The operations of 1315 may be performed according to the methods described herein. In some examples, aspects of the operations of 1315 may be performed by a MLB manager as described with reference to FIGS. 5 through 9.

Figure 14:
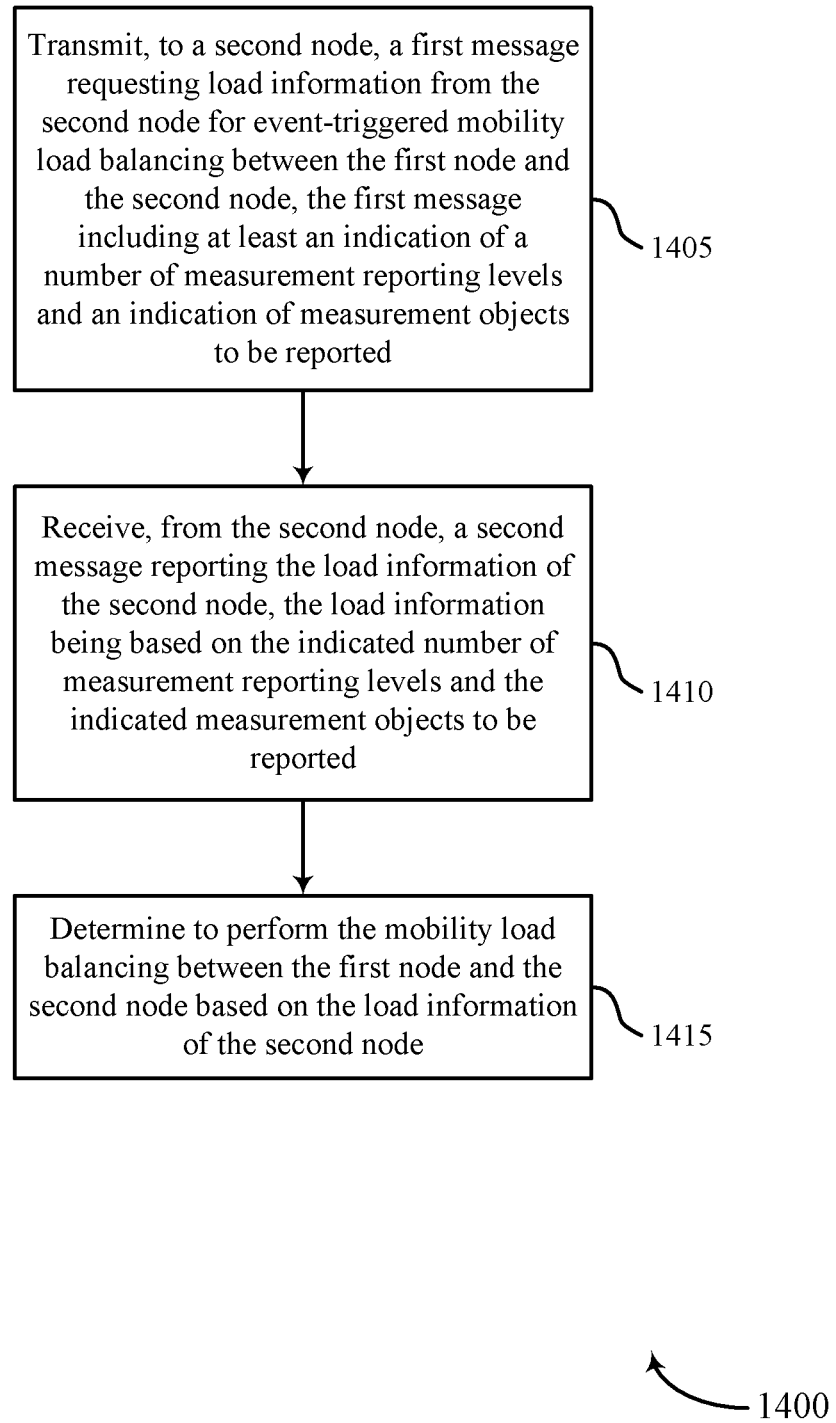

FIG. 14 shows a flowchart illustrating a method 1400 that supports inter-system and event-triggered MLB in accordance with aspects of the present disclosure. The operations of method 1400 may be implemented by a first node, or its components as described herein. For example, the operations of method 1400 may be performed by a communications manager as described with reference to FIGS. 5 through 9. In some examples, a node may execute a set of instructions to control the functional elements of a node to perform the functions described herein. Additionally or alternatively, a node may perform aspects of the functions described herein using special-purpose hardware.

At 1405, the first node may, to a second node, a first message requesting load information from the second node for event-triggered MLB between the first node and the second node, the first message including at least an indication of a number of measurement reporting levels and an indication of measurement objects to be reported. The operations of 1405 may be performed according to the methods described herein. In some examples, aspects of the operations of 1405 may be performed by a resource status request manager as described with reference to FIGS. 5 through 9.

At 1410, the first node may receive, from the second node, a second message reporting the load information of the second node, the load information being based on the indicated number of measurement reporting levels and the indicated measurement objects to be reported. The operations of 1410 may be performed according to the methods described herein. In some examples, aspects of the operations of 1410 may be performed by a resource status response manager as described with reference to FIGS. 5 through 9.

At 1415, the first node may determine to perform the MLB between the first node and the second node based on the load information of the second node. The operations of 1415 may be performed according to the methods described herein. In some examples, aspects of the operations of 1415 may be performed by a MLB manager as described with reference to FIGS. 5 through 9.

The following provides an overview of aspects of the present disclosure:

Aspect 1: A method for wireless communication at a first node, comprising: determining a traffic load at the first node based at least in part on a load reporting request, the first node operating in accordance with a first RAT; and transmitting, to a second node operating in accordance with a second RAT different from the first RAT, a first information report message for MLB between the first node and the second node, the first information report message comprising one or more IEs for reporting the determined traffic load, wherein the first RAT or the second RAT comprises an NR RAT or an E-UTRA RAT.

Aspect 2: The method of aspect 1, wherein determining the traffic load comprises: determining load information for a set of one or more cells, a set of one or more directional beams, a set of one or more network slices, or any combination thereof, the one or more IEs of the first information report message comprising a report of the determined load information.

Aspect 3: The method of aspect 2, wherein the load information comprises one or more load metrics including a CAC value, a radio resource status indicator, an HWL indicator, a TNL indicator, an uplink/downlink bit rate indicator, a PRB usage indicator, or any combination thereof.

Aspect 4: The method of any of aspects 1 through 3, further comprising: receiving, from the second node, a second information report message comprising one or more IEs comprising the load reporting request, wherein the one or more IEs of the second information report message include a periodic load reporting request IE, an event-triggered load reporting request IE, or any combination thereof.

Aspect 5: The method of aspect 4, further comprising: identifying, within the periodic load reporting request IE, a request for load information for a set of one or more cells, a set of one or more directional beams, a set of one or more network slices, or any combination thereof, wherein determining the traffic load comprises: determining the load information for the set of one or more cells, the set of one or more directional beams, the set of one or more network slices, or any combination thereof, wherein a periodic load reporting response IE of the first information report message comprises the determined load information.

Aspect 6: The method of aspect 5, further comprising: identifying, within the periodic load reporting request IE, a CGI for each cell of the set of one or more cells, wherein the load information for the set of one or more cells is based at least in part on the identified CGI.

Aspect 7: The method of any of aspects 5 through 6, further comprising: identifying, within the periodic load reporting request IE, an SSB index for each directional beam of the set of one or more directional beams, wherein the load information for the set of one or more directional beams is based at least in part on the identified SSB index.

Aspect 8: The method of any of aspects 5 through 7, wherein the set of one or more cells, the set of one or more directional beams, the set of one or more network slices, or any combination thereof, are associated with the first RAT or the second RAT.

Aspect 9: The method of any of aspects 4 through 8, further comprising: identifying, within the event-triggered load reporting request IE, a measurement reporting level IE comprising a set of two or more measurement reporting levels; and determining that the traffic load has changed from a first measurement reporting level to a second measurement reporting level different from the first measurement reporting level based at least in part on the set of two or more measurement reporting levels, wherein transmitting the first information report message comprises: transmitting the first information report message to the second node based at least in part on the determination that the traffic load has changed, wherein an event-triggered load reporting response IE of the first information report message comprises the determined load information.

Aspect 10: The method of any of aspects 4 through 9, wherein transmitting the first information report message comprises: identifying that the determined traffic load triggers an overload state of the first node; and transmitting the first information report message to the second node based at least in part on the determined traffic load triggering the overload state, wherein an event-triggered load reporting response IE of the first information report message comprises the determined load information.

Aspect 11: The method of any of aspects 4 through 10, wherein transmitting the first information report message comprises: identifying that the determined traffic load satisfies a threshold traffic level of the first node; and transmitting the first information report message to the second node based at least in part on the determined traffic load satisfying the threshold traffic level, wherein an event-triggered load reporting response IE of the first information report message comprises the determined load information.

Aspect 12: The method of any of aspects 1 through 11, wherein the first information report message comprises an inter-system SON information report message and is transmitted via an NG interface for a network operating in accordance with the NR RAT or an S1 interface for a network operating in accordance with the E-UTRA RAT.

Aspect 13: A method for wireless communication at a first node, comprising: receiving, from a second node, a first message requesting load information from the first node for event-triggered MLB between the first node and the second node, the first message comprising at least an indication of a number of measurement reporting levels and an indication of measurement objects to be reported; determining, at the first node, the load information based at least in part on the indicated number of measurement reporting levels and the indicated measurement objects to be reported; and transmitting, to the second node, a second message reporting the determined load information.

Aspect 14: The method of aspect 13, further comprising: identifying, within an IE, the indication of the number of measurement reporting levels, the number of measurement reporting levels comprising a set of two or more measurement reporting levels; and computing a load scale that corresponds to the set of two or more measurement reporting levels based at least in part on the indication, wherein the determined load information is reported based at least in part on the set of two or more measurement reporting levels.

Aspect 15: The method of any of aspects 13 through 14, further comprising: identifying, within an IE, the indication of the measurement objects to be reported, the measurement objects to be reported comprising requested load metrics for PRB event triggered load reporting, TNL capacity event triggered load reporting, CAC event triggered load reporting, or any combination thereof, wherein the determined load information is reported based at least in part on the requested load metrics.

Aspect 16: The method of any of aspects 13 through 15, wherein determining the load information comprises: determining the load information for a set of one or more cells, a set of one or more directional beams, a set of one or more network slices, or any combination thereof.

Aspect 17: The method of any of aspects 13 through 16, wherein the first node or the second node comprises a CU of a base station, a DU of the base station, a node associated with a user plane, a node associated with a control plane, a first base station, or a second base station.

Aspect 18: A method for wireless communication at a first node, comprising: transmitting, to a second node, a first information report message for MLB between the first node and the second node, the first information report message comprising one or more IEs including a load reporting request, wherein the first node operates in accordance with a first RAT and the second node operates in accordance with a second RAT different from the first RAT; receiving, from the second node, a second information report message, the second information report message comprising one or more IEs reporting a traffic load of the second node; and determining to perform the MLB between the first node and the second node based at least in part on the traffic load of the second node, wherein the first RAT or the second RAT comprises an NR RAT or an E-UTRA RAT.

Aspect 19: The method of aspect 18, wherein transmitting the first information report message comprises: transmitting, within the first information report message, a load information request for a set of one or more cells, a set of one or more directional beams, a set of one or more network slices, or any combination thereof, the one or more IEs of the first information report message comprising a periodic load reporting request IE, an event-triggered load reporting request IE, or any combination thereof.

Aspect 20: The method of aspect 19, wherein the traffic load of the second node comprises one or more load metrics including a CAC value, a radio resource status indicator, an HWL indicator, a TNL indicator, an uplink/downlink bit rate indicator, a PRB usage indicator, or any combination thereof.

Aspect 21: The method of any of aspects 19 through 20, wherein a periodic load reporting response IE of the second information report message comprises load information for the set of one or more cells, the set of one or more directional beams, the set of one or more network slices, or any combination thereof.

Aspect 22: The method of aspect 21, further comprising: transmitting, within the periodic load reporting request IE, a CGI for each cell of the set of one or more cells, wherein the load information for the set of one or more cells is based at least in part on the CGI.

Aspect 23: The method of any of aspects 21 through 22, further comprising: transmitting, within the periodic load reporting request IE, an SSB index for each directional beam of the set of one or more directional beams, wherein the load information for the set of one or more directional beams is based at least in part on the SSB index.

Aspect 24: The method of any of aspects 19 through 23, further comprising: transmitting, within the event-triggered load reporting request IE, a measurement reporting level IE comprising a set of two or more measurement reporting levels, wherein an event-triggered load reporting response IE of the second information report message comprises load information based at least in part on the set of two or more measurement reporting levels.

Aspect 25: The method of any of aspects 19 through 24, wherein receiving the second information report message is based at least in part on the traffic load triggering an overload state of the second node for a time duration.

Aspect 26: The method of any of aspects 19 through 25, wherein receiving the second information report message is based at least in part on the traffic load satisfying a threshold traffic level of the second node.

Aspect 27: A method for wireless communication at a first node, comprising: transmitting, to a second node, a first message requesting load information from the second node for event-triggered MLB between the first node and the second node, the first message comprising at least an indication of a number of measurement reporting levels and an indication of measurement objects to be reported; receiving, from the second node, a second message reporting the load information of the second node, the load information being based at least in part on the indicated number of measurement reporting levels and the indicated measurement objects to be reported; and determining to perform the MLB between the first node and the second node based at least in part on the load information of the second node.

Aspect 28: The method of aspect 27, further comprising: transmitting, within an IE, the indication of the number of measurement reporting levels, the number of measurement reporting levels comprising a set of two or more measurement reporting levels, wherein the load information is based at least in part on the set of two or more measurement reporting levels.

Aspect 29: The method of any of aspects 27 through 28, further comprising: transmitting, within an IE, the indication of the measurement objects to be reported, the measurement objects to be reported comprising requested load metrics for PRB event triggered load reporting, TNL capacity event triggered load reporting, CAC event triggered load reporting, or any combination thereof, wherein the load information is reported based at least in part on the requested load metrics.

Aspect 30: The method of any of aspects 27 through 29, wherein the load information comprises load information for a set of one or more cells, a set of one or more directional beams, a set of one or more network slices, or any combination thereof.

Aspect 31: An apparatus for wireless communication at a first node, comprising a processor; memory coupled with the processor; and instructions stored in the memory and executable by the processor to cause the apparatus to perform a method of any of aspects 1 through 12.

Aspect 32: An apparatus for wireless communication at a first node, comprising at least one means for performing a method of any of aspects 1 through 12.

Aspect 33: A non-transitory computer-readable medium storing code for wireless communication at a first node, the code comprising instructions executable by a processor to perform a method of any of aspects 1 through 12.

Aspect 34: An apparatus for wireless communication at a first node, comprising a processor; memory coupled with the processor; and instructions stored in the memory and executable by the processor to cause the apparatus to perform a method of any of aspects 13 through 17.

Aspect 35: An apparatus for wireless communication at a first node, comprising at least one means for performing a method of any of aspects 13 through 17.

Aspect 36: A non-transitory computer-readable medium storing code for wireless communication at a first node, the code comprising instructions executable by a processor to perform a method of any of aspects 13 through 17.

Aspect 37: An apparatus for wireless communication at a first node, comprising a processor; memory coupled with the processor; and instructions stored in the memory and executable by the processor to cause the apparatus to perform a method of any of aspects 18 through 26.

Aspect 38: An apparatus for wireless communication at a first node, comprising at least one means for performing a method of any of aspects 18 through 26.

Aspect 39: A non-transitory computer-readable medium storing code for wireless communication at a first node, the code comprising instructions executable by a processor to perform a method of any of aspects 18 through 26.

Aspect 40: An apparatus for wireless communication at a first node, comprising a processor; memory coupled with the processor; and instructions stored in the memory and executable by the processor to cause the apparatus to perform a method of any of aspects 27 through 30.

Aspect 41: An apparatus for wireless communication at a first node, comprising at least one means for performing a method of any of aspects 27 through 30.

Aspect 42: A non-transitory computer-readable medium storing code for wireless communication at a first node, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first node, comprising:
   determining a traffic load at the first node based at least in part on a load reporting request that comprises an indication of a quantity of measurement reporting levels, each measurement reporting level of the quantity of measurement reporting levels corresponding to a respective threshold of a set of thresholds, the first node operating in accordance with a first radio access technology (RAT);
   dividing a traffic overload value associated with the first node into the quantity of measurement reporting levels, wherein the quantity of measurement reporting levels are evenly distributed according to a linear scale below the traffic overload value;
   detecting a trigger event, wherein the trigger event comprises the traffic load satisfying a threshold of the set of thresholds; and
   transmitting, to a second node operating in accordance with a second RAT different from the first RAT, a first information report message for mobility load balancing between the first node and the second node based at least in part on detecting the trigger event, the first information report message comprising one or more information elements for reporting the determined traffic load, wherein the first RAT or the second RAT comprises a new radio (NR) RAT or an evolved universal terrestrial radio access (E-UTRA) RAT.

2. The method of claim 1, wherein determining the traffic load comprises:
   determining load information for a set of one or more cells, a set of one or more directional beams, a set of one or more network slices, or any combination thereof, the one or more information elements of the first information report message comprising a report of the determined load information.

3. The method of claim 2, wherein the load information comprises one or more load metrics including a composite available capacity value, a radio resource status indicator, a hardware load indicator, a transport network load indicator, an uplink/downlink bit rate indicator, a physical resource block usage indicator, or any combination thereof.

4. The method of claim 1, further comprising:
   receiving, from the second node, a second information report message comprising one or more information elements comprising the load reporting request, wherein the one or more information elements of the second information report message include a periodic load reporting request information element, an event-triggered load reporting request information element, or any combination thereof.

5. The method of claim 4, further comprising:
   identifying, within the periodic load reporting request information element, a request for load information for a set of one or more cells, a set of one or more directional beams, a set of one or more network slices, or any combination thereof, wherein determining the traffic load comprises:
   determining the load information for the set of one or more cells, the set of one or more directional beams, the set of one or more network slices, or any combination thereof, wherein a periodic load reporting response information element of the first information report message comprises the determined load information.

6. The method of claim 5, further comprising:
   identifying, within the periodic load reporting request information element, a cell global identifier for each cell of the set of one or more cells, wherein the load information for the set of one or more cells is based at least in part on the identified cell global identifier.

7. The method of claim 5, further comprising:
   identifying, within the periodic load reporting request information element, a synchronization signal block index for each directional beam of the set of one or more directional beams, wherein the load information for the set of one or more directional beams is based at least in part on the identified synchronization signal block index.

8. The method of claim 5, wherein the set of one or more cells, the set of one or more directional beams, the set of one or more network slices, or any combination thereof, are associated with the first RAT or the second RAT.

9. The method of claim 4, further comprising:
identifying, within the event-triggered load reporting request information element, a measurement reporting level information element comprising the quantity of measurement reporting levels, wherein detecting the trigger event comprises:
determining that the traffic load has changed from a first measurement reporting level to a second measurement reporting level different from the first measurement reporting level based at least in part on the quantity of measurement reporting levels, and wherein transmitting the first information report message comprises:
transmitting the first information report message to the second node based at least in part on the determination that the traffic load has changed, wherein an event-triggered load reporting response information element of the first information report message comprises the determined load information.

10. The method of claim 4, wherein detecting the trigger event comprises:
identifying that the determined traffic load triggers an overload state of the first node, wherein transmitting the first information report message to the second node is based at least in part on the determined traffic load triggering the overload state, and wherein an event-triggered load reporting response information element of the first information report message comprises the determined load information.

11. The method of claim 4, wherein detecting the trigger event comprises:
identifying that the determined traffic load satisfies a threshold traffic level of the first node, wherein transmitting the first information report message to the second node is based at least in part on the determined traffic load satisfying the threshold traffic level, and wherein an event-triggered load reporting response information element of the first information report message comprises the determined load information.

12. The method of claim 1, wherein the first information report message comprises an inter-system self-organizing network information report message and is transmitted via an NG interface for a network operating in accordance with the NR RAT or an Si interface for a network operating in accordance with the E-UTRA RAT.

13. A method for wireless communication at a first node, comprising:
receiving, from a second node, a first message requesting load information from the first node for event-triggered mobility load balancing between the first node and the second node, the first message comprising at least an indication of a quantity of measurement reporting levels and an indication of measurement objects to be reported, each measurement reporting level of the quantity of measurement reporting levels corresponding to a respective threshold of a set of thresholds;
dividing a traffic overload value associated with the first node into the quantity of measurement reporting levels, wherein the quantity of measurement reporting levels are evenly distributed according to a linear scale below the traffic overload value;
determining, at the first node, the load information based at least in part on the indicated quantity of measurement reporting levels and the indicated measurement objects to be reported;
detecting a trigger event, wherein the trigger event comprises a value associated with at least one measurement object satisfying a threshold of the set of thresholds, wherein the threshold is based at least in part on the indicated quantity of measurement reporting levels; and
transmitting, to the second node, a second message reporting the determined load information based at least in part on detecting the trigger event.

14. The method of claim 13, further comprising:
identifying, within an information element, the indication of the quantity of measurement reporting levels, the quantity of measurement reporting levels comprising a set of two or more measurement reporting levels; and
computing a load scale that corresponds to the set of two or more measurement reporting levels based at least in part on the indication, wherein the determined load information is reported based at least in part on the set of two or more measurement reporting levels.

15. The method of claim 13, further comprising:
identifying, within an information element, the indication of the measurement objects to be reported, the measurement objects to be reported comprising requested load metrics for physical resource block event triggered load reporting, transport network load capacity event triggered load reporting, composite available capacity event triggered load reporting, or any combination thereof, wherein the determined load information is reported based at least in part on the requested load metrics.

16. The method of claim 13, wherein determining the load information comprises:
determining the load information for a set of one or more cells, a set of one or more directional beams, a set of one or more network slices, or any combination thereof.

17. The method of claim 13, wherein the first node or the second node comprises a centralized unit of a network device, a distributed unit of the network device, a node associated with a user plane, a node associated with a control plane, a first network device, or a second network device.

18. A method for wireless communication at a first node, comprising:
transmitting, to a second node, a first information report message for mobility load balancing between the first node and the second node, the first information report message comprising one or more information elements including a load reporting request and an indication of a set quantity of measurement reporting levels, each measurement reporting level of the quantity of measurement reporting levels corresponding to a respective threshold of a set of thresholds, wherein the first node operates in accordance with a first radio access technology (RAT) and the second node operates in accordance with a second RAT different from the first RAT;
receiving, from the second node, a second information report message based at least in part on a trigger event, wherein the trigger event comprises a traffic load of the second node satisfying a threshold of the set of thresholds, the threshold corresponding to a measurement reporting level that is based at least in part on a traffic overload value associated with the second node that is divided by the quantity of measurement reporting levels and further based at least in part on an even distribution of the quantity of measurement reporting levels below the traffic overload value according to a linear scale, and wherein the second information report message comprises one or more information elements reporting the traffic load; and determining to perform the mobility load balancing between the first node and the second node based at least in part on the traffic load of the second node, wherein the first RAT or the second RAT comprises a new radio (NR) RAT or an evolved universal terrestrial radio access (E-UTRA) RAT.

19. The method of claim 18, wherein transmitting the first information report message comprises:

transmitting, within the first information report message, a load information request for a set of one or more cells, a set of one or more directional beams, a set of one or more network slices, or any combination thereof, the one or more information elements of the first information report message comprising a periodic load reporting request information element, an event-triggered load reporting request information element, or any combination thereof.

20. The method of claim 19, wherein the traffic load of the second node comprises one or more load metrics including a composite available capacity value, a radio resource status indicator, a hardware load indicator, a transport network load indicator, an uplink/downlink bit rate indicator, a physical resource block usage indicator, or any combination thereof.

21. The method of claim 19, wherein a periodic load reporting response information element of the second information report message comprises load information for the set of one or more cells, the set of one or more directional beams, the set of one or more network slices, or any combination thereof.

22. The method of claim 21, further comprising:

transmitting, within the periodic load reporting request information element, a cell global identifier for each cell of the set of one or more cells, wherein the load information for the set of one or more cells is based at least in part on the cell global identifier.

23. The method of claim 21, further comprising:

transmitting, within the periodic load reporting request information element, a synchronization signal block index for each directional beam of the set of one or more directional beams, wherein the load information for the set of one or more directional beams is based at least in part on the synchronization signal block index.

24. The method of claim 19, further comprising:

transmitting, within the event-triggered load reporting request information element, a measurement reporting level information element comprising the quantity of measurement reporting levels, wherein an event-triggered load reporting response information element of the second information report message comprises load information based at least in part on the quantity of measurement reporting levels.

25. The method of claim 19, wherein:

receiving the second information report message is based at least in part on the traffic load triggering an overload state of the second node for a time duration.

26. The method of claim 19, wherein:

receiving the second information report message is based at least in part on the traffic load satisfying a threshold traffic level of the second node.

27. A method for wireless communication at a first node, comprising:

transmitting, to a second node, a first message requesting load information from the second node for event-triggered mobility load balancing between the first node and the second node, the first message comprising at least an indication of a quantity of measurement reporting levels and an indication of measurement objects to be reported, each measurement reporting level of the quantity of measurement reporting levels corresponding to a respective threshold of a set of thresholds;

receiving, from the second node, a second message reporting the load information of the second node based at least in part on a trigger event, wherein the trigger event comprises a value associated with at least one measurement object satisfying a threshold of the set of thresholds, the threshold corresponding to a measurement reporting level that is based at least in part on a traffic overload value associated with the second node that is divided by the quantity of measurement reporting levels and further based at least in part on an even distribution of the quantity of measurement reporting levels below the traffic overload value according to a linear scale, and wherein the load information is based at least in part on the indicated quantity of measurement reporting levels and the indicated measurement objects to be reported; and determining to perform the mobility load balancing between the first node and the second node based at least in part on the load information of the second node.

28. The method of claim 27, further comprising:

transmitting, within an information element, the indication of the quantity of measurement reporting levels, the quantity of measurement reporting levels comprising a set of two or more measurement reporting levels, wherein the load information is based at least in part on the set of two or more measurement reporting levels.

29. The method of claim 27, further comprising:

transmitting, within an information element, the indication of the measurement objects to be reported, the measurement objects to be reported comprising requested load metrics for physical resource block event triggered load reporting, transport network load capacity event triggered load reporting, composite available capacity event triggered load reporting, or any combination thereof, wherein the load information is reported based at least in part on the requested load metrics.

30. The method of claim 27, wherein the load information comprises load information for a set of one or more cells, a set of one or more directional beams, a set of one or more network slices, or any combination thereof.

* * * * *